(12) United States Patent
Muraki et al.

(10) Patent No.: US 7,247,784 B2
(45) Date of Patent: Jul. 24, 2007

(54) MUSICAL SOUND GENERATOR, PORTABLE TERMINAL, MUSICAL SOUND GENERATING METHOD, AND STORAGE MEDIUM

(75) Inventors: Yasuyuki Muraki, Hamamatsu (JP); Ichiro Futohashi, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 374 days.

(21) Appl. No.: 10/344,806

(22) PCT Filed: Aug. 17, 2001

(86) PCT No.: PCT/JP01/07092

§ 371 (c)(1),
(2), (4) Date: Nov. 3, 2003

(87) PCT Pub. No.: WO02/17294

PCT Pub. Date: Feb. 28, 2002

(65) Prior Publication Data

US 2004/0069124 A1    Apr. 15, 2004

(30) Foreign Application Priority Data

Aug. 18, 2000  (JP) .............................. 2000-248469
May 28, 2001   (JP) .............................. 2001-158994

(51) Int. Cl.
    *A63H 5/00*    (2006.01)
(52) U.S. Cl. ............................ 84/609; 84/622; 84/649; 84/659
(58) Field of Classification Search .................... None
    See application file for complete search history.

(56) References Cited

U.S. PATENT DOCUMENTS 5,696,342 A    12/1997    Shimizu (Continued)

FOREIGN PATENT DOCUMENTS

JP    6-167978    6/1994

(Continued)

OTHER PUBLICATIONS

Roland JV-1000 Music Workstation Instruction Manual, 6-pgs., May 13, 1993.

(Continued)

*Primary Examiner*—Marlon Fletcher
(74) *Attorney, Agent, or Firm*—Pillsbury Winthrop Shaw Pittman LLP

(57) ABSTRACT

There are provided a musical tone-generating apparatus which neither requires hardware having an increased circuit size nor imposes a heavy burden on a CPU thereof, and a mobile terminal apparatus including the musical tone-generating apparatus, as well as a musical tone-generating method, and a storage medium storing a program for executing the method. A CPU converts music contents data stored in a RAM to hardware tone generator control data, stores the resulting data into the RAM. In reproduction, the CPU reads out and sends the hardware tone generator control data to a hardware tone generator. A data decoder circuit of the hardware tone generator sequentially reads out the hardware tone generator control data from a FIFO and separates the read data into time management information and data of a parameter for generation of a musical tone, and sets the time management information to a counter. Under the control of the counter performing the time management, a register write controller writes data of the parameter into a tone generator control register at timing indicated by the time management information. A tone generator section produces the musical tone based on the data stored in the tone generator control register.

12 Claims, 24 Drawing Sheets

U.S. PATENT DOCUMENTS

| | | | |
|---|---|---|---|
| 5,770,812 A * | 6/1998 | Kitayama | 84/603 |
| 5,890,119 A | 3/1999 | Suzuki | |
| 5,895,877 A | 4/1999 | Tamura | |
| 5,949,011 A * | 9/1999 | Ichiki | 84/602 |
| 6,034,314 A | 3/2000 | Koike | |
| 6,184,454 B1 | 2/2001 | Imai et al. | |
| 6,479,739 B2 * | 11/2002 | Tamura | 84/603 |
| 6,911,592 B1 * | 6/2005 | Futamase et al. | 84/622 |

FOREIGN PATENT DOCUMENTS

| | | |
|---|---|---|
| JP | 9-22287 | 1/1997 |
| JP | 9-198045 | 7/1997 |
| JP | 10-124046 | 5/1998 |
| JP | 3003559 | 11/1999 |
| JP | 2000-29462 A | 1/2000 |
| JP | 2000-092042 | 3/2000 |
| JP | 2000-224269 | 11/2000 |

OTHER PUBLICATIONS

Abridged Translation of the Official Action—Japanese Patent Application No. 2001-158994 mailed Jan. 4, 2005, 3-pgs.

Abridged Translation Official Notice, Application No. 10-2003-7002365, mailed Jan. 11, 2005, 3-pgs.

* cited by examiner

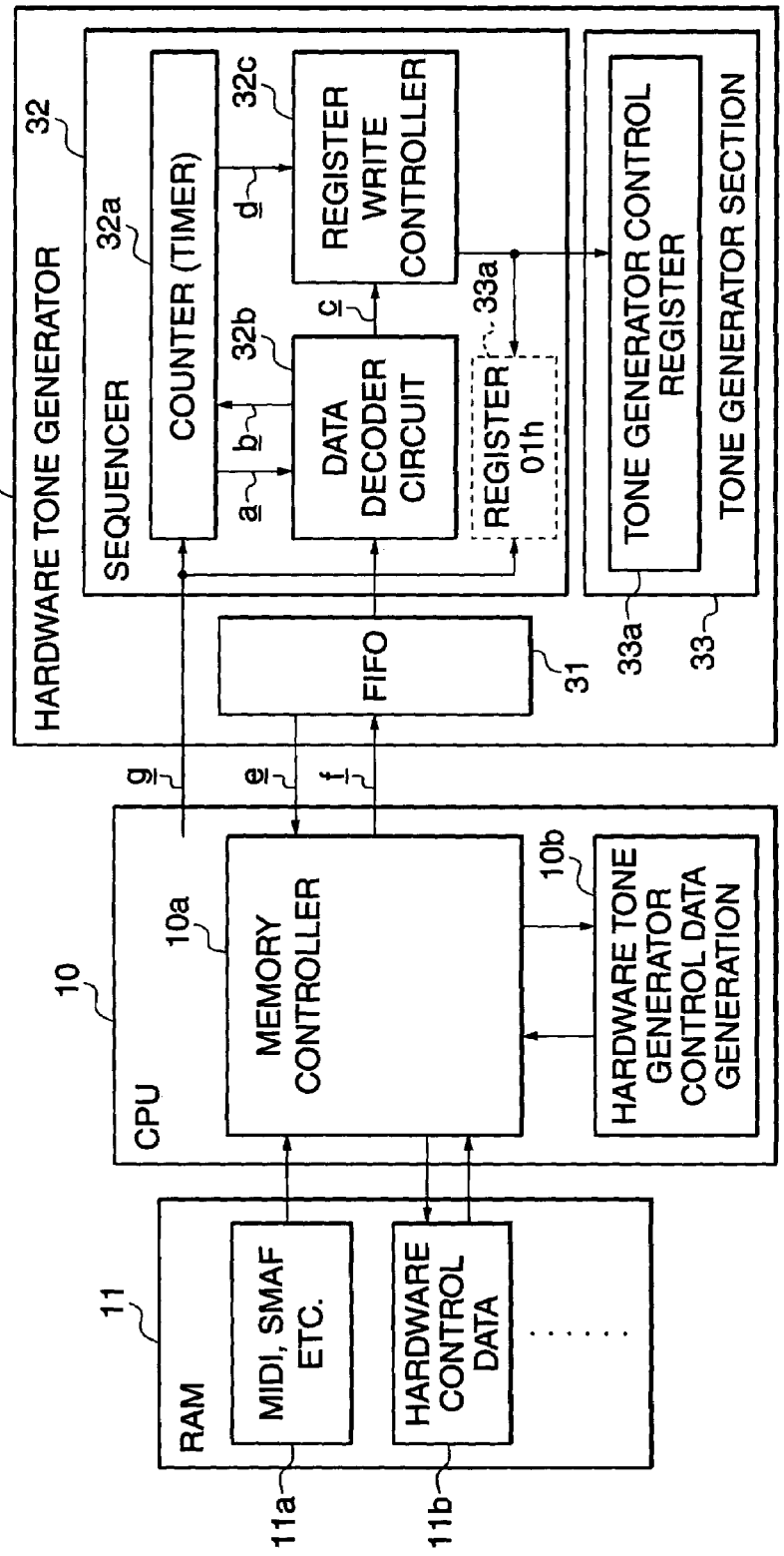

FIG. 6

|  | SMAF | | TONE GENERATOR CONTROL REGISTER MAP-ADAPTED DATA | |
|---|---|---|---|---|
| | | | TONE GENERATOR CONTROL REGISTER INDEX | TONE GENERATOR CONTROL REGISTER DATA |
| DURATION | EVENT | | | |
| 00 | 00 30 47 | (PROGRAM CHANGE) → | INDEX : 18h | DATA : 10h |
| 00 | 00 37 7F | (CHANNEL VOLUME) → | INDEX : E0h | DATA  1Fh |
| 00 | 2C 50 | (NOTE MESSAGE) → | INDEX : B0h | DATA : B2h |
| | | | INDEX : C0h | DATA : 32h |
| 5C | 2B 20 | (NOTE MESSAGE) → | INDEX : B0h | DATA : 8Bh |
| | | | INDEX : C0h | DATA : 32h |
| 2D | D5 07 | (NOTE MESSAGE) → | INDEX : B3h | DATA : CCh |
| | | | INDEX : C3h | DATA : 2Dh |
| 00 | 29 50 | (NOTE MESSAGE) → | INDEX : B0h | DATA : 44h |
| | | | INDEX : C0h | DATA : 32h |

FIG. 7

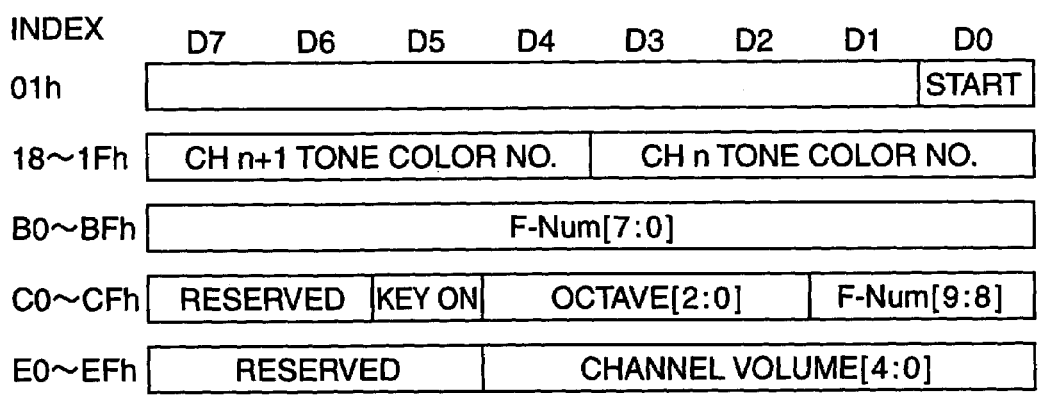

FIG. 10

| ADDRESS/INDEX | DATA | | |
|---|---|---|---|
| FFh | 00h | | |
| 18h | 10h | | ⎫ |
| E0h | 1Fh | (KEY ON) | ⎬ TONE GENERATOR CONTROL REGISTER WRITE DATA A |
| B0h | B2h | | |
| C0h | 32h | | ⎭ |
| FFh | 50h | | |
| B0h | B2h | (KEY OFF) | ⎱ TONE GENERATOR CONTROL REGISTER WRITE DATA B |
| C0h | 12h | | ⎰ DUE TO GATE TIME = 50, WITH LAPSE OF REFERENCE TIME PERIOD 50 AFTER KEY-ON OF A, KEY-OFF EFFECTED |
| FFh | 0Ch | | |
| B0h | 8Bh | (KEY ON) | ⎱ TONE GENERATOR CONTROL REGISTER WRITE DATA C |
| C0h | 32h | | ⎰ |
| FFh | 20h | | |
| B0h | 8Bh | (KEY OFF) | ⎱ TONE GENERATOR CONTROL REGISTER WRITE DATA D |
| C0h | 12h | | ⎰ DUE TO GATE TIME = 20, WITH LAPSE OF REFERENCE TIME PERIOD 20 AFTER KEY-ON OF C, KEY-OFF EFFECTED |
| FFh | 0Dh | | |
| B3h | CCh | (KEY ON) | ⎫ |
| C3h | 2Dh | | ⎬ TONE GENERATOR CONTROL REGISTER WRITE DATA E |
| B0h | 44h | (KEY ON) | |
| C0h | 32h | | ⎭ |
| ⋮ | ⋮ | | |
| FFh | 01h | | |
| 01h | 00h | | SEQUENCER TERMINATED |

FIG. 14

| TIME MANAGEMENT INFORMATION | TONE GENERATOR CONTROL REGISTER WRITE DATA | | |
|---|---|---|---|
| | INDEX | DATA | |
| 00h | 18h | 10h | |
| 00h | E0h | 1Fh | |
| 00h | B0h | B2h | (KEY ON) |
| 00h | C0h | 32h | |
| 50h | B0h | B2h | (KEY OFF) |
| 00h | C0h | 12h | |
| 0Ch | B0h | 8Bh | (KEY ON) |
| 00h | C0h | 32h | |
| 20h | B0h | 8Bh | (KEY OFF) |
| 00h | C0h | 12h | |
| 0Dh | B3h | CCh | (KEY ON) |
| 00h | C3h | 2Dh | |
| ⋮ | ⋮ | ⋮ | |
| 80h 32 | C0h | 32h | |
| ⋮ | ⋮ | ⋮ | |
| 01h | 01h | 00h | SEQUENCER TERMINATION |

FIG. 19

| TIME MANAGEMENT INFORMATION | TONE GENERATOR CONTROL REGISTER WRITE DATA | |
|---|---|---|
| | INDEX | DATA |
| 80h | 98h | 80h |
| 80h | 33h 81h | 1Dh 3Eh 9Fh |
| 01h 80h | B0h | B2h |
| 80h | C0h | B2h |
| D0h | B0h | B2h |
| 80h | C0h | 92h |
| 12h 8Ch | B0h | 8Bh |
| 80h | 38h 81h | 32h |
| A0h | 68h 81h | 10h 11h 92h |
| 80h | C0h | 92h |
| 8Dh | B3h | CCh |
| 80h | C3h | 2Dh 80h |
| ⋮ | ⋮ | ⋮ |
| 80h 32 | C0h | 32h |
| ⋮ | ⋮ | ⋮ |
| 01h | 01h | 00h |

MUSICAL SOUND GENERATOR, PORTABLE TERMINAL, MUSICAL SOUND GENERATING METHOD, AND STORAGE MEDIUM

This application is the National Phase of International Application PCT/JP01/07092 filed 17 Aug. 2001 which designated the U.S. and that International Application was not published under PCT Article 21(2) in English.

TECHNICAL FIELD

This invention relates to a musical tone-generating apparatus which has a simple construction and is capable of generating melodies, a mobile terminal apparatus, a musical tone-generating method, and a storage medium storing a program for executing the method.

BACKGROUND ART

Conventional musical tone-generating apparatuses include a hardware musical tone-generating apparatus which uses hardware to generate musical tones, and a software musical tone-generating apparatus which causes a computer to execute a musical tone-generating program to generate musical tones.

FIG. 25 shows an example of the arrangement of the conventional hardware musical tone-generating apparatus. In FIG. 25, a CPU (Central Processing Unit) 110 supplies music contents data 111, such as MIDI (Musical Instrument Digital Interface) data and SMAF (Synthetic Music Mobile Application Format) data, referred to hereinafter, to a hardware tone generator 115. In this case, the MIDI data and SMAF data may be transferred from the outside of the apparatus, or read from a storage means of the apparatus. The hardware tone generator 115 includes a sequencer 132, and a tone generator section implemented by hardware. The sequencer 132 has hardware-specific control data-generating section 132a which converts the MIDI data and the SMAF data to control data specific to the hardware tone generator 115, and a time management section 132b which manages the timing of sounding musical tones based on time management information contained in the data.

In the hardware musical tone-generating apparatus constructed as above, the time management section 132b instructs the hardware-specific control data-generating section 132a to output data in timing based on interval data indicative of time intervals between events contained in the control data and gate time data indicative of a sounding time period. Responsive to the instruction, the hardware-specific control data-generating section 132a delivers the hardware-specific control data generated thereby to the tone generator section 133. The tone generator section 133 generates musical tones based on the supplied hardware-specific control data. Thus, the musical tones are reproduced.

FIG. 26 shows an example of the arrangement of the conventional software musical tone-generating apparatus. In FIG. 26, a CPU 210 includes a sequencer function means 232 which is realized by a sequencer program executed by the CPU 210. The sequencer means 232 is comprised of a hardware-specific control data-generating means 232a, and a time management means 232b. The hardware-specific control data-generating means 232a which converts MIDI data and SMAF data 211 to control data specific to a hardware tone generator 215, while the time management means 232b controls the timing of sounding musical tones. It should be noted that the MIDI data and the SMAF data converted by the hardware-specific control data-generating means 232a may be transferred from the outside of the apparatus or read from a storage means of the apparatus. Further, the hardware tone generator 215 which generates musical tones from the hardware-specific control data includes a tone generator section 233 implemented by hardware.

In the software musical tone-generating apparatus thus constructed, to reproduce musical tones, the time management means 232b of the CPU 210 instructs the hardware-specific control data-generating means 232a to output data in timing based on duration data indicative of time intervals between events, and gate time data indicative of a sounding time period, both of which data are contained in the converted hardware-specific control data. Responsive to the instruction, the hardware-specific control data-generating means 232a delivers the hardware-specific control data generated thereby to the hardware tone generator 215. In the hardware tone generator 215, the tone generator section 233 generates and outputs musical tones based on the hardware-specific control data supplied. The musical tones are thus reproduced by the software musical tone-generating apparatus.

However, in the hardware musical tone-generating apparatus which is a musical tone-generating apparatus implemented by hardware, the sequencer 132 executes the conversion of the musical contents data and time management, which complicates the construction of the sequencer 132, resulting in an increased circuit size of the sequencer, and hence increased manufacturing costs.

Further, in the software musical tone-generating apparatus which is a musical tone-generating apparatus implemented by software, the CPU 210 carries out the conversion of musical contents data and time management, which imposes a large burden on the CPU 210, and hence a high-speed CPU is required. Particularly, when the CPU executes other processing with higher importance, such as communication control, as its main function, an expensive high-speed CPU is required to carry out the processing of the sequencer.

Further, the conventional hardware tone-generating apparatus and the conventional software tone-generating apparatus starts reproduction of a musical piece from the head thereof. This causes the inconvenience that when the musical piece is reproduced as incoming call music for a cellular phone or the like, only the leading portion of the musical piece can be heard.

DISCLOSURE OF INVENTION

It is a first object of the invention to provide a musical tone-generating apparatus which neither requires hardware having an increased circuit size nor imposes a heavy burden on a CPU thereof, and a mobile terminal apparatus including the musical tone-generating apparatus, as well as a musical tone-generating method, and a storage medium storing a program for executing the method.

It is a second object of the invention to enable such a musical tone-generating apparatus and a cellular phone to reproduce the musical piece starting with a desired point thereof.

To attain the first object, according to a first aspect of the invention, there is provided a musical tone-generating apparatus comprising software process means for generating hardware tone generator control data based on music contents data having time management information and event data, and hardware tone generator means having a tone generation section comprised of hardware, for generating a musical tone based on the hardware tone generator control data provided from the software process means, wherein the software process means converts the event data which is contained in the music contents data to specific data which can be processed by the hardware tone generator means, and generates the hardware tone generator control data as data containing the converted data and the time management information; and wherein the hardware tone generator means samples a parameter for generation of a musical tone by the tone generation section from the converted data based on the provided tone generator control data. and generates a musical tone based on the parameter, whenever timing based on the time management information is reached.

According to this musical tone-generating apparatus, software process means converts music contents data to hardware tone generator control data, and time management is executed by hardware tone generator means. Therefore, the size of a circuit of a sequence provided in the hardware tone generator means can be reduced. In this case, the time management can be carried out by a simplified construction using counter means. Further, since the software process means is not required to carry out processing for the time management, a burden on the software process means can be reduced, thereby dispensing with the use of a high-speed CPU.

Preferably, the musical tone-generating apparatus includes storage means for storing the music contents data, and the software process means converts the music contents data stored in the storage means to the hardware tone generator control data by making use of time during which the software process means has extra processing capability, and stores the converted hardware tone generator control data in the storage means.

According to this preferred embodiment, the software process means converts the music contents data stored in the storage means to the hardware tone generator control data by making use of time during which the software process means has extra processing capability. Therefore, it is possible to prevent a load from being concentrated on the software process means, whereby it is possible to further reduce the needs of a high-speed CPU.

Preferably, the hardware tone generator means includes buffer memory means that can store a predetermined amount of the hardware tone generator control data, and the software process means converts the music contents data in such an amount that the resulting hardware tone generator control data can be stored in the buffer memory means, and transfers the resulting hardware tone generator control data to the buffer memory means.

Preferably, the hardware tone generator means includes counter means for starting counting of clocks of a clock signal generated whenever a unit of reference time elapses, a tone generator control register that controls generation of the musical tone based on the parameter for generation of the musical tone, and write means for writing the parameter following the time management information into the tone generator control register when a count of the counter means becomes equal to or larger than a value indicated by the time management information.

To particularly attain the second object, the musical tone-generating apparatus includes point register means for storing data of an arbitrary performance start point, and the hardware tone generator means generates musical tones based on hardware tone generator control data starting with a point corresponding to the data of the performance start point stored in the point register means.

According to this preferred embodiment, the musical tone-generating apparatus includes point register means for storing data of an arbitrary performance start point, and musical tones are reproduced based on hardware tone generator control data starting with a point corresponding to the data of the performance start point stored in the point register means. Therefore, it is possible to reproduce a musical piece as contents data starting with a desired point thereof. This makes it possible to listen to the musical piece reproduced as an incoming call music, starting with a desired point of the musical piece.

Preferably, when the software process means converts the music contents data to the hardware tone generator control data, if time management information items have an identical value, and index information items indicative of addresses into which a parameter for generation of a musical tone is to be written are successive to each other, an immediately following one of the index information items which immediately follows the time management information items is set to a leading index information item, and the parameter for generation of a musical tone which follows the immediately following index information item is formed by a plurality of parameters corresponding to the index information items successive to each other.

According to this preferred embodiment, if time management information items have an identical value, and index information items indicative of addresses into which a parameter for generation of a musical tone is to be written are successive to each other, an immediately following one of the index information items which immediately follows the time management information items is set to a leading index information item, and the parameter for generation of a musical tone which follows the immediately following index information item is formed by a plurality of parameters corresponding to the index information items successive to each other, whereby the amount of hardware-based tone generator control data cab be reduced, thereby reducing the burden on the software processing means and hardware-based tone generator means.

More preferably, the hardware tone generator means includes counter means for starting counting of clocks of a clock signal generated whenever a unit of reference time elapses, a tone generator control register that controls generation of the musical tone based on the parameter for generation of the musical tone, and write means for writing the parameter following the time management information into the tone generator control register when a count of the counter means becomes equal to or larger than a value indicated by the time management information, and if the parameter is formed by data of the plurality of parameters, writes each parameter data into the tone generator control register while incrementing the address indicated by the index information one by one.

More preferably, the software process means includes separator means for separating the hardware tone generator control data into the parameter for generating the musical tone and the time management information.

Further preferably, the hardware tone generator control data is composed of units each comprising a set of the time management information, and at least one pair of an index designating an address of the tone generator control register and data of the parameter to be written into the address.

Even more preferably, each of the units of the tone generator hardware control data is formed by the time management information, the index, and the data of the parameter.

Even more preferably, the time management information includes a time management information-discriminating address which indicates whether or not data immediately following the time management information-discriminating address is data of the value indicated by the time management information.

To attain the first object, according to a second aspect of the invention, there is provided a mobile terminal apparatus comprising a musical tone-generating apparatus comprising, software process means for generating hardware tone generator control data and based on music contents data having time management information and event data, and hardware tone generator means having a tone generation section comprised of hardware, for generating a musical tone based on the hardware tone generator control data provided from the software process means, wherein the software process means converts the event data which is contained in the music contents data to specific data which can be processed by the hardware tone generator means, and generates the hardware tone generator control data as data containing the converted data and the time management information, and wherein the hardware tone generator means samples a parameter for generation of a musical tone by the tone generation section from the converted data based on the provided tone generator control data, and generates a musical tone based on the parameter, whenever timing based on the time management information is reached, and a processing device that performs processing of mobile terminal functions, wherein the software process means is realized by part of functions of the processing device.

According to this mobile terminal apparatus, the same advantageous effects as describe above can be obtained.

To particularly attain the second object, it is preferred that the musical tone-generating apparatus point register means for storing data of an arbitrary performance start point, and wherein the hardware tone generator means generates musical tones based on hardware tone generator control data starting with a point corresponding to the data of the performance start point stored in the point register means.

According to this preferred embodiment, the same advantageous effects as describe above can be obtained.

To attain the first object, according to a third aspect of the invention, there is provided a musical tone-generating method comprising a software process step of causing software process means to generate hardware tone generator control data based on music contents data having time management information and event data, and a tone-generating step of causing hardware tone generator means having a tone generation section comprised of hardware to generate a musical tone based on the hardware tone generator control data generated in the software process step, wherein the software process step converts the event data which is contained in the music contents data to specific data which can be processed by the hardware tone generator means, and generates the hardware tone generator control data as data containing the converted data and the time management information, and wherein the musical tone-generating step samples a parameter for generation of a musical tone by the tone generation section from the converted data based on the provided tone generator control data, and generates a musical tone based on the parameter, whenever timing based on the time management information is reached.

According to this musical tone-generating method, the same advantageous effects as described above can be obtained.

To attain the first object, according to a fourth aspect of the invention, there is provided a storage medium storing a program for causing a computer to execute a musical tone-generating method for generating a musical tone based on music contents data, the program comprising, a software process module for generating hardware tone generator control data based on music contents data having time management information and event data, and a musical tone-generating module for causing hardware tone generator means having a tone generation section comprised of hardware to generate a musical tone based on the hardware tone generator control data generated by the software process module, wherein the software process module converts the event data which is contained in the music contents data to specific data which can be processed by the hardware tone generator means, and generates the hardware tone generator control data as data containing the converted data and the time management information, and wherein the tone-generating module samples a parameter for generation of a musical tone by the tone generation section from the converted data based on the provided tone generator control data, and generates a musical tone based on the parameter, whenever timing based on the time management information is reached.

According to this storage medium, the same advantageous effects as described above can be obtained.

BRIEF DESCRIPTION OF DRAWINGS

FIG. 2 is a diagram showing an example of the construction of the musical tone-generating apparatus according to the first embodiment;

FIG. 6 is a diagram showing a format of data adapted to a tone generator control map with time management information of hardware tone generator control data omitted, used in the musical tone-generating apparatus according to the first embodiment, in a manner associated with SMAF data before conversion;

FIG. 7 is a diagram showing the tone generator control register map used in the musical tone-generating apparatus according to the first embodiment;

FIG. 10 is a diagram showing the hardware tone generator control data having the first data structure, which are rearranged in sets of data;

FIG. 14 is a diagram showing the hardware tone generator control data having the second data structure, which are rearranged in sets of data;

FIG. 19 is a chart showing an example of hardware tone generator control data converted from SMAF data using the musical tone-generating apparatus according to the third embodiment;

BEST MODE OF CARRYING OUT THE INVENTION

Now, the present invention will be described in detail with reference to the drawings showing embodiments thereof.

Figure 1:
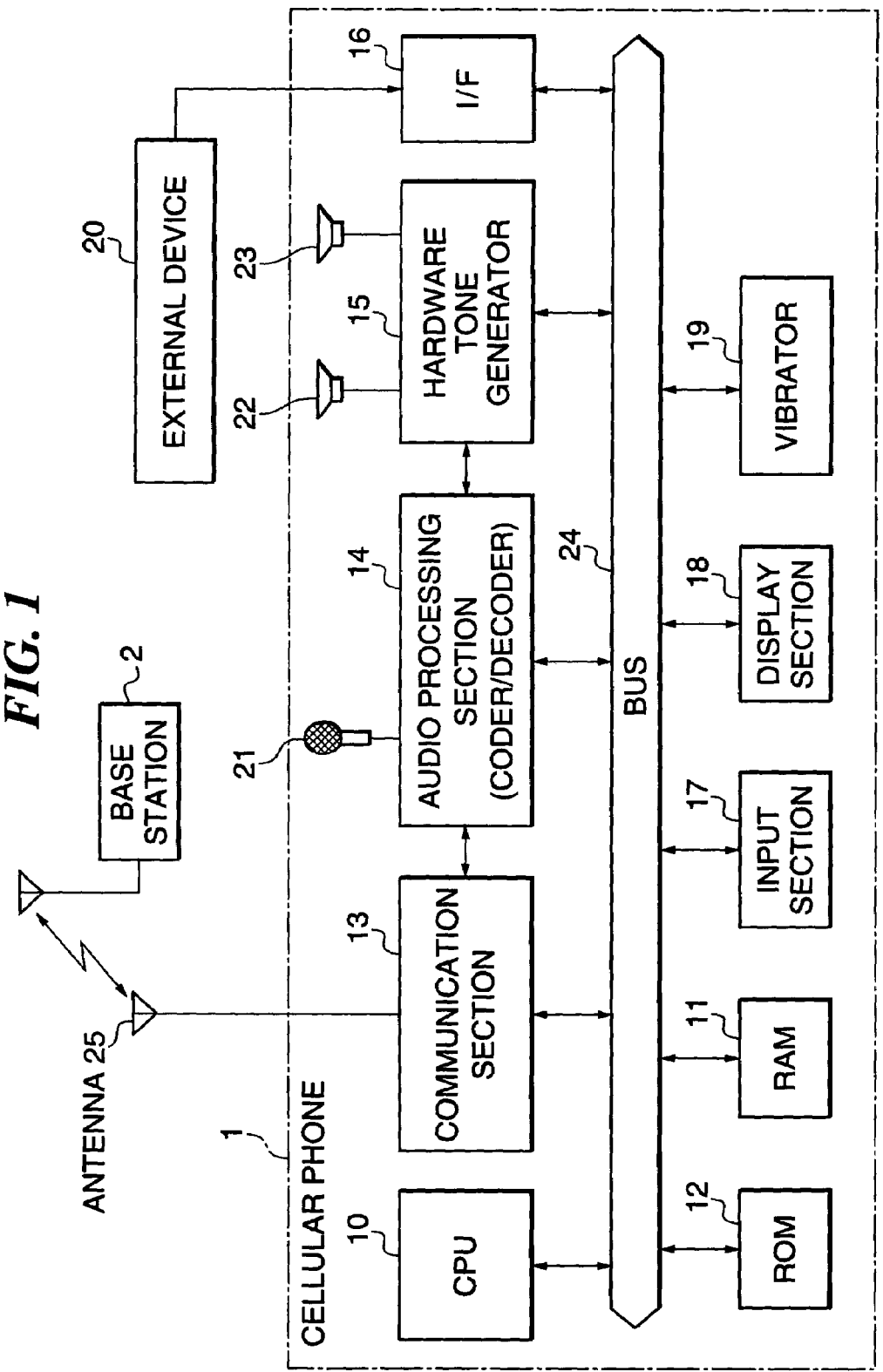
FIG. 1 is a diagram showing an example of the configuration of a cellular phone to which is applied a mobile terminal apparatus provided with a musical tone-generating apparatus according to a first embodiment of the present invention.

FIG. 1 shows an example of the configuration of a cellular phone to which is applied a mobile terminal apparatus provided with a musical tone-generating apparatus according to a first embodiment of the present invention, together with a base station.

The cellular phone 1 is provided with an antenna 25, which is generally a retractable type and can be connected to the base station 2 by radio. The antenna 25 is connected to a communication section 13 having a modulating/demodulating function. A CPU (Central Processing Unit) 10 serves as a system controller that controls components of the cellular phone 1 by executing a telephone function program, and includes a timer that indicates elapsed time during operation and generates a timer interrupt at predetermined time intervals. Further, the CPU 10 carries out processes related to generation of musical tones such as a data conversion process, as described in detail hereinafter. A RAM (Random Access Memory) 11 provides a storage area for storing music contents data of a distribution format which are downloaded from a download center or the like connected via the basic station 2, a storage area for storing hardware tone generator control data converted from the music contents data, and a work area for the CPU 10. A ROM (Read Only Memory) 12 stores various programs executed by the CPU 12 such as telephone function programs for sending or receiving a call, programs for processes related to generation of musical tones, and various data, such as preset hardware tone generator control data.

The communication section 13 carries out demodulation of a signal received at the antenna 25, as well as modulation of a signal to be transmitted and supplies the modulated signal to the antenna 25. The incoming call signal demodulated by the communication section 13 is decoded by an audio processing section (coder/decoder) 14, and a call signal input from a microphone 21 is compression coded by the audio processing section 14. The audio processing section 14 subjects a sound or audio signal to high-efficiency compression encoding/decoding, and is implemented by a coder/decoder based on a CELP (Code Excited LPC) method and an ADPCM (Adaptive Differential PCM encoding) method. A hardware tone generator 15 converts the call signal received from the audio processing section 14 into sound to be sounded via a received message speaker 22, or generates an incoming call music or music-on-hold by reproducing the converted hardware tone generator control data. It should be noted that the incoming call music is sounded via an incoming call speaker 23, while the music-on-hold is sounded via the received message speaker 22 after being mixed with the incoming call signal.

Further, as the format of music contents data, there are employed a MID format and a SMAF format which are convenient to distribution of data, and the CPU 10 converts the music contents data in these formats into hardware tone generator control data having a format specific to the hardware tone generator 15, whereby it is possible to reproduce musical tones based on the data in these formats. The converted hardware tone generator control data can be stored in the RAM 11. The hardware tone generator 15 reproduces musical tones based on the hardware tone generator control data, and to this end, has provided therein a FIFO for temporarily storing a predetermined amount of the hardware tone generator control data. The FIFO may have a storage capacity large enough to store the whole of one musical piece, but if the capacity of the FIFO is not large enough to store the whole music piece, it may be so configured that whenever a predetermined amount of unused area is produced in the FIFO, the hardware tone generator 15 sends a FIFO data request signal to the CPU 10. Responsive to this request signal, the CPU 10 continues to read the following portion of the hardware tone generator data stored in the RAM 11 or ROM 12, and delivers the read data to the hardware tone generator 15. This makes it possible to reproduce a musical piece formed by a large amount of hardware tone generator control data even with a small-capacity FIFO.

Further, an interface (I/F) 16 provides interface for downloading music contents data and the like from an external apparatus 20, such as a personal computer. An input section 17 is an input means comprised of dial buttons for inputting "0" to "9", respectively, and other buttons. A display 18 displays a menu of options for selecting telephone functions, and images associated with operations of respective buttons, including the dial buttons. A vibrator 19 vibrates the body of the cellular phone 1 upon receipt of an incoming call in place of generating the incoming call sound. It should be noted that all the components and sections are connected to each other via a bus 24.

FIG. 2 shows the construction of the musical tone-generating apparatus according to the first embodiment of the present invention, which is used in the cellular phone 1 as its hardware tone generator 15. In FIG. 2, the received message speaker 22, the incoming call speaker 23, and components associated therewith are omitted. The CPU 10, the hardware tone generator 15, and the RAM 11 are communicated with each other for transfer of data therebetween by the bus 24, though not shown in FIG. 2.

In the FIG. 2 musical tone-generating apparatus according to the first embodiment, the RAM 11 stores MID data, SMAF data and the like, formed as files, in an area 11a thereof. Further, when the CPU 10 has extra capability of processing or available processing time, the CPU 10 reads out musical contents data from the area 11a of the RAM 11 and carries out a converting process for converting the read data to hardware tone generator control data, to store the converted hardware tone generator control data in an area 11b of the RAM 11. The area 11a can store musical contents data of a plurality of musical pieces, and the area 11b can also store hardware tone generator control data of a plurality of musical pieces.

As described above, the CPU 10 reads out musical contents data from the area 11a of the RAM 11 and carries out the converting process for converting the read data to hardware tone generator control data, which is stored in the area 11b of the RAM 11. The converting process is executed by a hardware tone generator control data-generating means 10b of the CPU 10, which is implemented by software. When the CPU 10 converts the music contents data to the hardware tone generator control data, a memory controller 10a sequentially reads out music contents data to be converted from the area 11a of the RAM 11 starting from the leading portion of the data, and supplies the read data to a hardware tone generator control data-generating means 10b. The hardware tone generator control data-generating means 10b interprets the supplied music contents data and sequentially converts the same to hardware tone generator control data. The memory controller 10a sequentially writes the hardware tone generator control data thus obtained into the area 11b of the RAM 11. In this way, the CPU 10 converts the music contents data to the hardware tone generator control data.

It should be noted that when the CPU 10 performs the reproduction of musical tones while executing the data-converting process, the memory controller 10a writes the hardware tone generator control data f thus obtained into a FIFO (First-In First-Out) 31 of the hardware tone generator 15.

The hardware tone generator 15 includes the FIFO 31 capable of storing a predetermined amount of hardware tone generator control data, and a sequencer 32 sequentially reads out the hardware tone generator control data from the FIFO 31. The FIFO 31 is capable of storing e.g. 32 words of the hardware control data, in a First-In First-Out method, i.e. reads out the hardware tone generator control data in the order in which the data were written. When a predetermined amount of unused area occurs in the FIFO 31 as a result of reading of the hardware tone generator control data therefrom, the FIFO 31 sends a FIFO data request signal e to the memory controller 10a of the CPU 10, requesting the following hardware tone generator control data f to be transferred to the FIFO 31. This enables reproduction of a musical piece or pieces of a large amount of hardware tone generator control data by using a FIFO with a small capacity for the FIFO 31.

The sequencer 32 of the hardware tone generator 15 includes a data decoder circuit 32b, which separates the hardware tone generator control data read out from the FIFO 31 into time management information and tone generator control register write data. In this case, when a time management information-discriminating address is added to the hardware tone generator control data in a position immediately before the time management information, data, which is one byte, for example, following the time management information-discriminating address is separated as time management information. The remaining part of the hardware tone generator control data other than the time management information-discriminating address and the time management information, that is, tone generator control register write data provides a parameter for generating musical tone, and is written into a tone generator control register 33a of a tone generator section 33 under the control of a register write controller 32c. The register write controller 32c writes the tone generator control register write data into the tone generator control register 33a in timing in which a register write-permitting signal d is outputted. The register write-permitting signal d is outputted in timing in which the count of a counter (timer) 32a becomes equal to a value of duration or a value of gate time contained in the time management information, as will be described hereinafter.

The counter 32a of the sequencer 32 counts clock pulses output, e.g. at time intervals of 1 millisecond, as reference time units. The counting of the clock pulses is started when a sequencer start signal g output from the CPU 10 is applied to the counter 32a. Further, the sequencer start signal g instructs starting of operation of the sequencer by writing data "01h" into a register 01h arranged within the sequencer 32 of the tone generator control register 33a, to thereby set "1" to a bit D0 (start) thereof. This causes the sequencer 32 to start sequencer processing, and when the counter 32a starts counting, the counter 32a applies a data decode start signal a to the data decoder circuit 32b. The data decoder circuit 32b is responsive to the data decode start signal a to read out hardware tone generator control data from the FIFO 31 and then extracts the time management information therefrom. The extracted time management information b is sent to the counter 32a, and when the count of the counter 32a becomes equal to or larger than the time management information b, the counter 32a applies the register write-permitting signal d to the register write controller 32c to write the tone generator control register write data c extracted by the data decoder circuit 32b into the tone generator control register 33a. This causes the tone generator section 33 to generate musical tones based on the tone generator control register write data c and output the musical tones. Then, the data decoder circuit 32b reads out the next hardware tone generator control data from the FIFO 31.

Then, the data decoder circuit 32b extracts the next time management information from the read hardware tone generator control data, and the same process as described above is repeatedly carried out. That is, when the count of the counter 32a becomes equal to or larger than the next time management information b, the counter 32a applies the register write-permitting signal d to the register write controller 32c, to write the next tone generator control register write data c extracted by the data decoder circuit 32b into the tone generator control register 33a. This causes the tone generator section 33 to generate musical tones based on the next tone generator control register write data c and output the generated musical tones. Then, the data decoder circuit 32b reads out the second next hardware tone generator control data from the FIFO 31. Thus, the hardware tone generator control data is sequentially read from the FIFO 31, whereby the tone generator 33 reproduces musical tones.

Next, the operation of the musical tone-generating apparatus shown in FIG. 2 performed in response to an instruction for reproduction will be described.

Figure 3A:
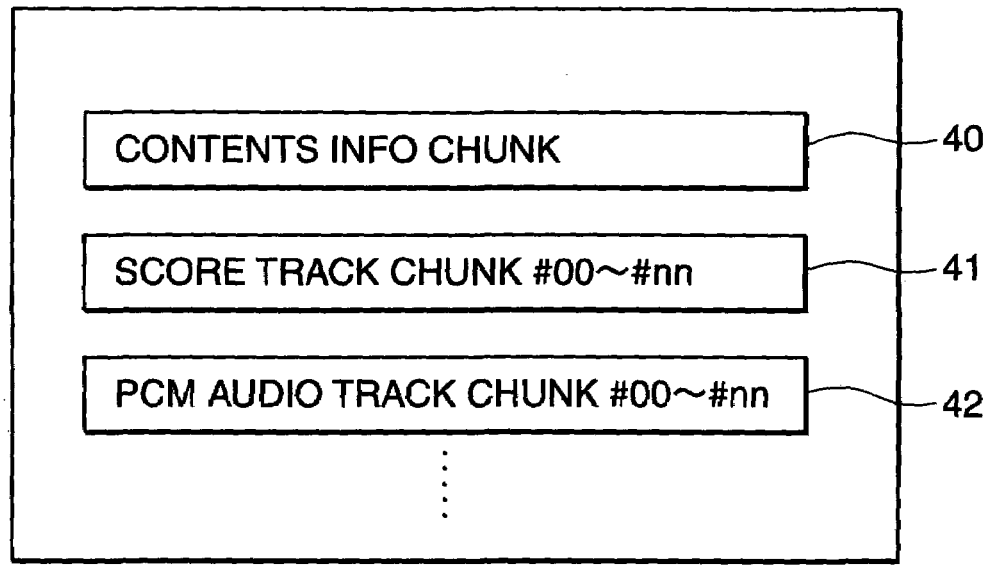
FIG. 3A is a diagram showing a data structure of SMAF data format.
Figure 3B:
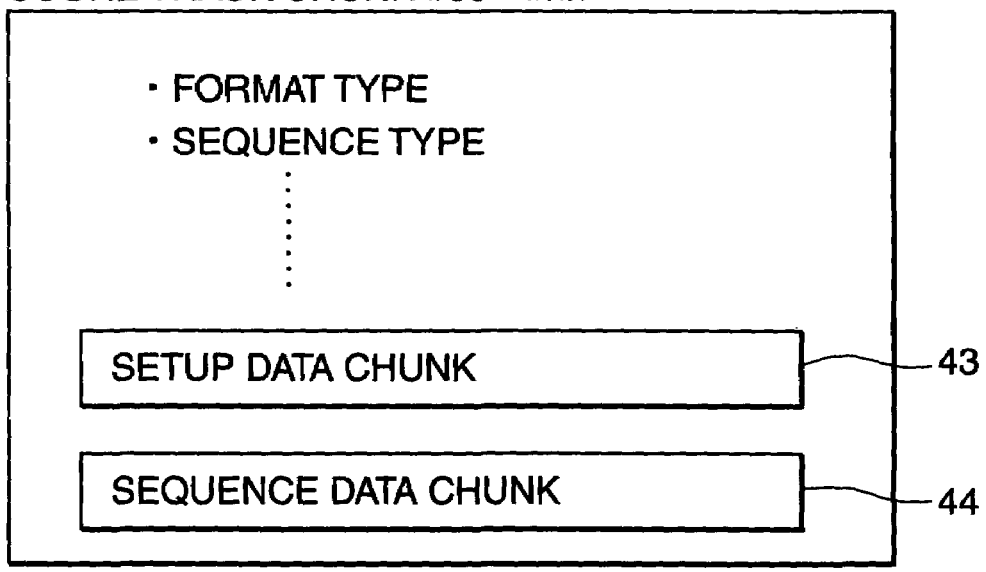
FIG. 3B is a diagram showing a data structure of a score track chunk in the data structure of the SMAF data format.
Figure 4:
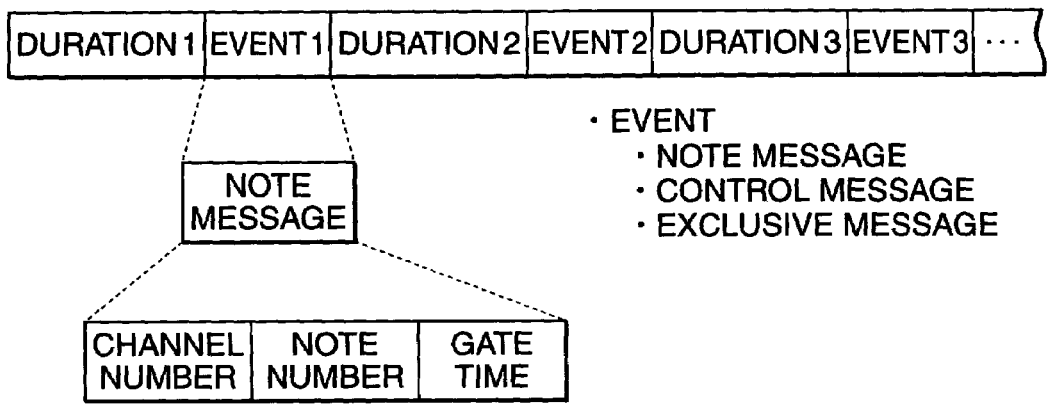
FIG. 4 is a diagram showing a data structure of a sequence data chunk in the score track chunk of the SMAF data format.

First, the SMAF format will be described. Data structures of the SMAF format are shown in FIGS. 3A, 3B and 4. As shown in FIG. 3A, the SMAF data has a chunk structure and is comprised of a contents information chunk (Contents Info Chunk) 40, a score track chunk 41, and a PCM audio track chunk 42. The contents information chunk 40 includes information and definitions of the contents, the score track chunk 41 stores a tone generator sequence track, and the PCM audio track chunk 42 stores compressed PCM-type audio sounding data, such as ADPCM data, MP3 (MPEG audio layer 3) data, and TwinVQ data, in the form of events.

The data structure of the score track chunk 41 is shown in FIG. 3B. As shown in the figure, the score track chunk 41 is comprised of data of a format type, a sequence type, etc., and chunks, such as a setup data chunk 43 and a sequence data chunk 44. The format type data indicates a status of the data in which the actual format of this chunk is defined, and can define the format type as a handy phone standard type, for instance. The sequence type data indicates one of two types of sequence data, i.e. a stream sequencer type and a sub-sequencer type. The setup data chunk 43 stores tone color data, settings of effects and the like, and the sequence data chunk 44 stores sequence data which is real performance data.

Next, the data structure of the sequence data stored in the sequence data chunk 44 is shown in FIG. 4. As shown in the figure, the sequence data is comprised of pairs of data, each pair formed by one byte of duration data, and two or three bytes of event data, which are arranged in an alternating manner. In this case, the format is configured such that duration data necessarily exists before each event data. The duration data indicates time information indicative of a time interval between the event immediately preceding the duration data and an event immediately following the duration data. Further, the events include a note message for controlling sounding, a control message for controlling a volume, a modulation, and the like, an exclusive message which can carry information peculiar to a maker of the data, etc. Further, the note message is comprised of a channel number indicative of a designated sounding channel, a note number indicative of a tone pitch of a musical tone to be sounded, a gate time indicative of a duration of sounding.

Figure 5:
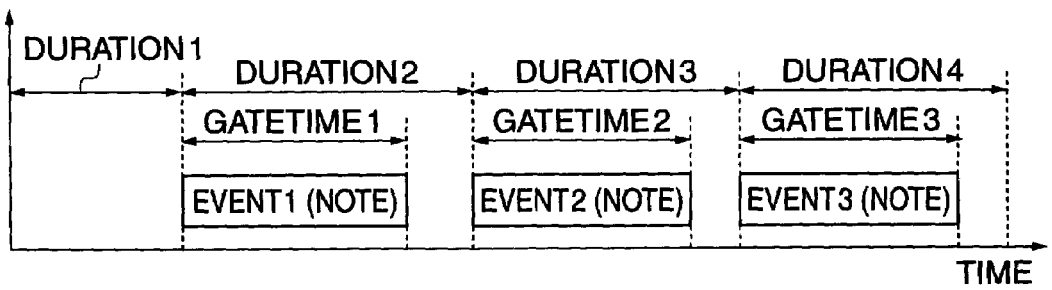
FIG. 5 is a diagram showing sequence data as an example of the SMAF data plotted along time axis.

The FIG. 4 sequence data composed of duration data 1 to duration data 3 and event data 1 to event data 3 can be expressed along the time axis as shown in FIG. 5. Assuming that an event 1, an event 2, and an event 3 are note messages for note on (sounding), the sounding by the event 1 is started upon the lapse of a time period indicated by the duration 1. Further, the sounding by the event is stopped upon the lapse of a time period indicated by the gate time 1 after the start of sounding by the event 1, and then when a time period indicated by the duration 2 has elapsed after the lapse of the time period indicated by the duration 1, the sounding by the event 2 is started. Then, when a time period indicated by the gate time 2 has elapsed after the start of sounding by the event 2, the sounding by the event 2 is stopped. Further, when a time period indicated by the duration 3 has elapsed after the lapse of the time period indicated by the duration 2, the sounding by an event 3 is started. Then, when a time period indicated by the gate time 3 has elapsed after the start of sounding by the event 3, the sounding by the event 3 is stopped. Hereafter, the FIG. 4 sequence data is referred to as the "SMAF data".

Referring again to FIG. 2, the hardware tone generator control data-generating means 10b converts music contents data, e.g. SMAF data, to hardware tone generator control data. Here, the hardware tone generator control data formed by the conversion is sequentially transferred to the hardware tone generator 15, and the tone generator section 33 generates musical tones based on the hardware tone generator control data. To this end, the hardware tone generator control data is configured to have a data structure adapted to a register map of the tone generator control register 33a of the tone generator section 33. Here, an example of hardware tone generator control data formed by converting the SMAF data is shown. Although the hardware tone generator control data contains time management information corresponding to duration and gate time, the time management information is not written into the tone generator control register 33a. Tone generator control register map-adapted data formed by eliminating the time management information from the hardware tone generator control data is shown in FIG. 6 in a manner associated with the SMAF data before conversion.

In FIG. 6, duration data "00" and an event "00 30 47" of a program change message of SMAF data are converted to an index "18h" and data "10h". In these data, "h" indicates that the numerical value is in hexadecimal notation. The index designates the address of a register shown in the tone generator control register map of the tone generator control register 33a shown in FIG. 7, and the data following the index is written into a register having the address indicated by the index. In this case, each register has a capacity of one byte, and the tone generator control register 33a has one register to be addressed by an index "01h", eight registers to be addressed by respective indexes "18h" to 1Fh", sixteen registers to be addressed by respective indexes "B0h" to "BFh", sixteen registers to be addressed by respective indexes "C0h" to "CFh", and sixteen registers to be addressed by respective indexes "E0h" to "EFh". It should be noted that only the register "01h" to be addressed by the index "01h" is arranged within the sequencer 32, as shown in FIG. 2. Further, the length of each index is one byte, and hence each register is formed of eight bits, for storing data having the corresponding length of one byte.

Each of the eight registers to be addressed by the respective indexes "18h" to "1Fh" is used for designating a tone color number of a channel n and a tone color number of a next channel n+1. This enables designation of respective tone colors of sixteen channels. Further, each of the sixteen registers to be addressed by the respective indexes "B0h" to "BFh" stores less significant eight bits of an F number defined in ten bits representative of a numerical value proportional to the frequency of the tone pitch assigned to each key of a keyboard. Further, each of the sixteen registers to be addressed by the respective indexes "C0h" to "CFh" stores the remaining more significant two bits of the F number at respective bits D0 and D1 thereof, three bits defining octave information at respective bits D2, D3, D4 thereof, and key-on information at a bit D5 thereof. This makes it possible to designate a tone pitch defined by the F number and the octave, and key-on, for each of the sixteen channels. Further, each of the sixteen registers to be addressed by the respective indexes "E0h" to "EFh" stores five bits defining channel volume information at respective bits D0 to D4. Thus, the channel volume information can be designated for each of the sixteen channels.

Therefore, through conversion of the duration data "00" and the event "00 30 47" of the program change message of SMAF data to the index "18h" and data "10h", the data "10h" is stored in the register 18h, whereby the tone color having the tone color number "01h" is designated for the channel 1, and the tone color having the tone color number "1h" is designated for the channel 2.

Further, duration data "00" and an event "00 37 7F" of a channel volume message of the next SMAF data are converted to the index "E0h" and data "1Fh". The data "1Fh" formed by the conversion is stored in the register E0h, whereby the data "1Fh" designates the volume value of the channel 1 as "1Fh".

Further, duration data "00" and an event "2C 50" of a note message of the next SMAF data are converted to the index "B0h" and data "B2h", and the index "C0h" and data "32h". The data "B2h" formed by the conversion is stored in the register B0h, and the data "32h" formed by the conversion is stored in the register C0h. Ten bits formed by 0-th to 8-th bits provided by the data "B2h" ("1010010" in binary notation) and 9-th and 10-th bits at bits D0 and D1 of the data "32h" ("00110010" in binary notation) designates the F number of the channel 1. Further, the three bits "100" at respective bits D2, D3, D4 of the data "32h" designate an octave of the channel 1. Further, "1" at a bit D5 of the data "32h" designates key-on of the channel 1.

Further, duration data "5C" and an event "2B 20" of a note message of the next SMAF data are converted to the index "B0h" and data "8Bh", and the index "C0h" and data "32h". The data "8Bh" formed by the conversion is stored in the register B0h, and the data "32h" formed by the conversion is stored in the register C0h. Ten bits "1010001011" formed by 0-th to 8-th bits provided by the data "8Bh" ("10001011" in binary notation) and 9-th and 10-th bits at bits D0 and D1 of the data "32h" ("00110010" in binary notation) designate the F number of the channel 1. Further, three bits "100" at bits D2, D3, D4 of the data "32h" designate an octave of the channel 1. Further, "1" at a bit D5 of the data "32h" designates key-on of the channel 1.

The SMAF data and tone generator control register map-adapted data formed by converting the SMAF data are associated with each other as described above, and the following data are also similarly converted.

It should be noted that the event "2C 50" of the note message and the event "2B 20" of SMAF data are shown in hexadecimal notation, and "50" and "20" within them are gate time data each indicative of a time period over which the sounding of musical tones is carried out. That is, the sounding by these note messages must be stopped when the reference time of "50h" or "20h" has elapsed. That is, to effect note-off upon the lapse of the reference time of "50h" or "20h" after the sounding was started, there are required duration data set to "50h" or "20h", and a not message instructing key off, with key-on/key-off information being set to "0".

Figure 8:
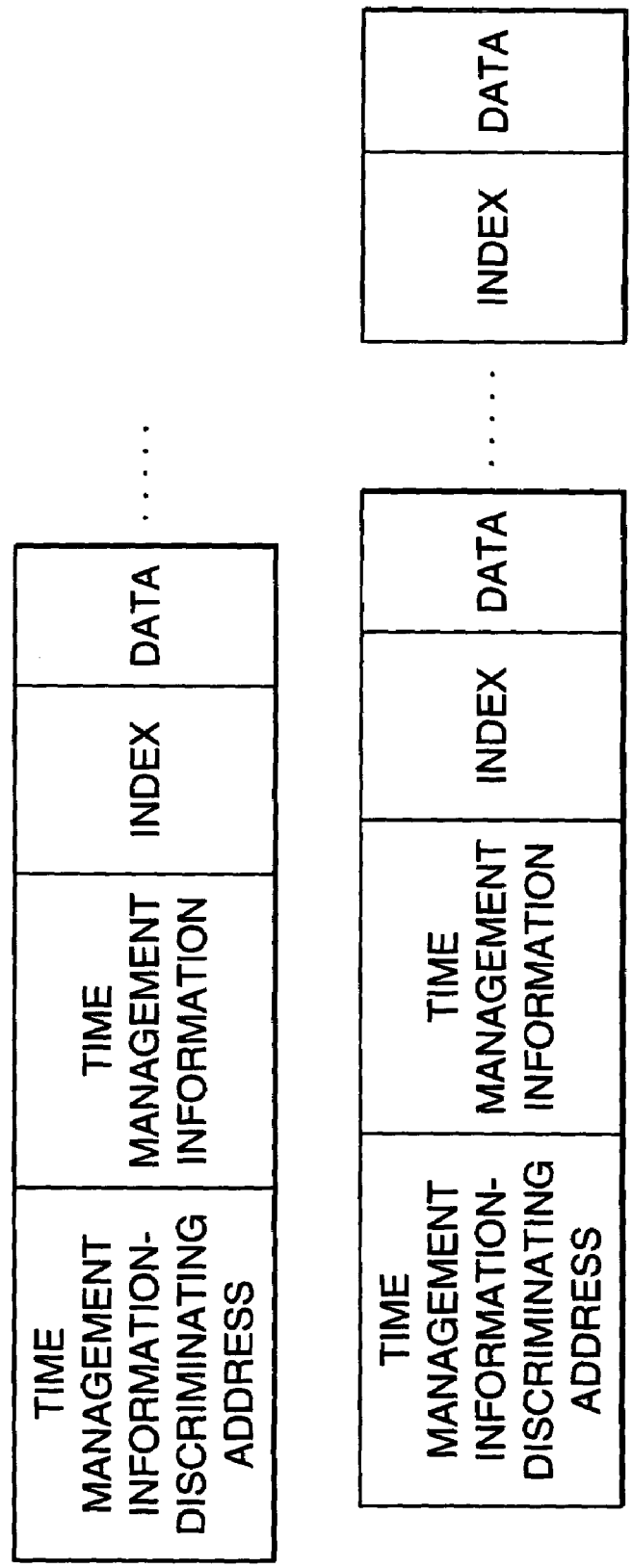
FIG. 8 is a diagram showing a first data structure of the hardware tone generator control data including the time management information, used in the musical tone-generating apparatus according to the first embodiment.
Figure 9:
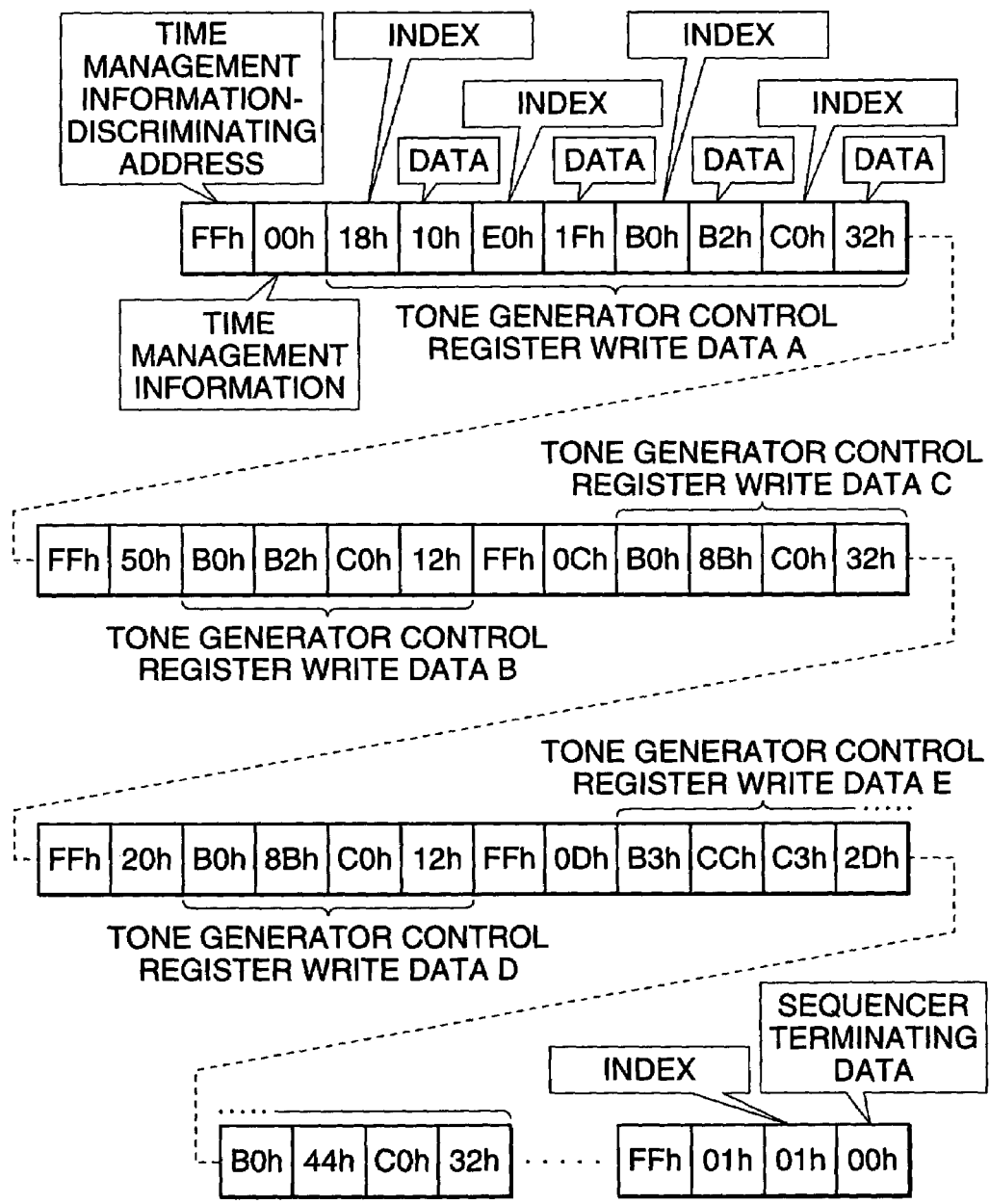
FIG. 9 is a diagram showing an example of the hardware tone generator control data having the first data structure used in the musical tone-generating apparatus according to the first embodiment.

Such note messages are not shown in FIG. 6, but are automatically generated by the hardware tone generator control data-generating means 10b during the data conversion, through interpretation of SMAF data before the conversion. Therefore, for the help of explanation, a first data structure of the hardware tone generator control data converted from the SMAF data which includes time management information is shown in FIG. 8, and an example of hardware tone generator control data having the first data structure formed by converting the FIG. 6 SMAF data is shown in FIG. 9. Further, the FIG. 9 hardware tone generator control data rearranged in sets of data is shown in FIG. 10.

As shown in FIG. 8, in the first data structure of the hardware tone generator control data, a time management information-discriminating address and time management information forms a set of data, and the time management information-discriminating address is arranged in a position immediately before the time management information. That is, when the time management information-discriminating address is detected, it is assumed that data following the detected time management information-discriminating address is time management information. Following the time management information, at least one set of data each formed by a pair of an index and data is provided. The index is information, as described hereinabove, which indicates an address of each register provided in the tone generator control register 33a, and the data following the index is written into the register indicated by the address. Further, the timing in which the data is written into the register is designated by the time management information arranged in a position immediately before the at least one pair of the index and data. The hardware tone generator control data-generating means 10b converts the SMAF data to the hardware tone generator control data shown in FIG. 8.

FIG. 9 shows the hardware tone generator control data formed by the hardware tone generator control data-generating means 10b interpreting and converting the FIG. 6 SMAF data. In the FIG. 9 hardware tone generator control data, sequencer terminating data is also added in addition to the time management information. That is, the first data is set to "FFh" defined as the time management information-discriminating address, and then time management information "00h" as the duration data follows. The data following the duration data are, as described above, the set of data formed by the pair of the index "18h" and data "10h", the set of data formed by the pair of the index "B0h" and data "B2h" and the pair of the index "C0h" and data "32h", and so forth. This sequence of data designates the tone colors of the channels 1 and 2, and the volume of the channel 1, as well as the key-on and a tone pitch of the channel 1.

The following data is data, not shown in FIG. 6, for terminating the sounding of musical tones reproduced via the channel 1. The timing of start of the sounding of the channel 1 is set to timing indicated by the time management information "00h" arranged in a position immediately before the sounding data. Then, the sounding is terminated in timing of the lapse of the gate time. In other words, the time management information of data of which the sounding is to be stopped is a data value corresponding to the gate time. That is, the data for terminating the sounding is formed by a set of data formed by a pair of "FFh" as the time management information-discriminating address and time management information "50h" and a set of data subsequent thereto formed by a pair of the index "B0h" and data "B2h" and a pair of the index "C0h" and data "12h". This data causes the data "B2h" to be stored in the register B0h and the data "B2h" in the register C0h upon the lapse of the reference time "50h", whereby ten bits "1010110010" formed by 0-th to 8-th bits formed by the data "B2h" ("10110010" in binary notation") and 9-th and 10-th bits of "10" at bits D0 and D1 of the data "12h" ("00010010" in binary notation) designate the F number of the channel 1. Further, three bits "100" at bits D2, D3, D4 of the data "12h" designate the octave of the channel 1. Further, "0" at a bit D5 of the data "12h" designates the key-off of the channel 1. This causes the musical tone of the channel 1 being sounded based on the designated octave and F number to be stopped upon the lapse of the reference time "50h".

The following data are also written in the tone generator control register 33a. At the end of the hardware tone generator control data, there are provided data formed by a pair of the time management information-discriminating address "FFh" and the time management data "00h", and data subsequent thereto which is formed by a pair of the index "01h" and data "00h" ("00000000" in binary notation). In this case, the data "00h" is set to the register 01h of the tone generator control register 33a, which is arranged within the sequencer 32, in timing of the lapse of the reference time "01h" from the occurrence of the immediately preceding event. This sets "0" to the bit D0 (start) of the register 01h shown in FIG. 7, whereby the termination of sequencer operation is instructed to the sequencer 32. In short, the index "01h" and data "00h" form the sequencer terminating data.

FIG. 10 shows rearrangement of the hardware tone generator control data having the first data structure and formed by the hardware tone generator control data-generating means 10b through interpretation and conversion of the SMAF data, in sets of data. As shown in the figure, the hardware tone generator control data having the first data structure is composed of data each formed by a pair of a time management information-discriminating address and time management information and data each formed by a pair of an index and data. The operation of the FIG. 2 musical tone-generating apparatus performed when reproduction of a musical piece is instructed by designating the hardware tone generator control data thus converted from the SMAF data will be described with reference to FIGS. 2 and 10. It is assumed, however, that the hardware tone generator control data has been converted from the SMAF data by the CPU 10 and the resulting data has been stored in the area 11b of the RAM 11 prior to the reproduction of the musical piece.

The memory controller 10a of the CPU 10 reads out hardware tone generator control data f shown in FIG. 10 which corresponds to the musical piece designated for reproduction from the area 11b of the RAM 1, e.g. by an amount of 32 bytes, and transfers the same to the FIFO 31 of the hardware tone generator 15. Simultaneously, the CPU 10 supplies the sequencer start signal g to the counter 32a of the sequencer 32.

Further, the sequencer start signal g is written into the register 01h as part of the tone generator control register 33a to set "1" to the bit D0 (start) thereof, thereby instructing the sequencer operation to be started. This causes the sequencer 32 to start the sequencer operation, and the counter 32a operates in response to the sequencer start signal g to start counting clocks as units of the reference time, and at the same time applies the data decode start signal a to the data decoder circuit 32b. The data decoder circuit 32b operates in response to the data decode start signal a to read data from the FIFO 31 one byte by one byte. In this case, when the read data is the time management information-discriminating address "FFh", another byte is further read out. As shown in FIG. 10, data following the time management information-discriminating address is time management information, and therefore, this information is set to the counter 32a.

Further, the data decoder circuit 32b continues to read out the following data from the FIFO 31, and the index "18h" read out and the data "10h" read out in succession thereto are both tone generator control register write data, and hence sent to the register write controller 32c. The register write controller 32c prepares for writing the data "10h" into the register 18h having the address indicated by the index "18h". In this case as well, the time management information set to the counter 32a is "00h", and hence the counter 32a instantly applies the register write-permitting signal d to the register write controller 32c, whereupon, responsive to this signal, the register write controller 32c writes the data "10h" into the register 18h of the tone generator control register 33a. The register 18h designates the tone cooler numbers of the channels 1 and 2, so that the tone colors of the channels 1 and 2 of musical tones generated from the tone generator section 33 are designated.

Also further, the data decoder circuit 32b continues to read out the following data from the FIFO 31, and the index "E0h" read out and the data "1Fh" read out in succession thereto are both tone generator control register write data, and hence sent to the register write controller 32c. The register write controller 32c prepares for writing the data "1Fh" into the register E0h having the address indicated by the index "E0h". In this case as well, the time management information set to the counter 32a is "00h", and hence the counter 32a instantly applies the register write-permitting signal d to the register write controller 32c, whereupon, responsive to this signal, the register write controller 32c writes the data "1Fh" into the register E0h of the tone generator control register 33a. The register E0h designates the channel volume of the channel 1, so that the channel volume of the channel 1 of a musical piece generated by the tone generator section 33 is designated.

Further, the data decoder circuit 32b continues to read out the following data from the FIFO 31, and the index "B0h" read out and the data "B2h" read out in succession thereto are both tone generator control register write data, and hence sent to the register write controller 32c. The register write controller 32c prepares for writing the data "B2h" into the register B0h having the address indicated by the index "B0h". In this case as well, the time management information set to the counter 32a is "00h", and hence the counter 32a instantly applies the register write-permitting signal d to the register write controller 32c, whereupon, responsive to this signal, the register write controller 32c writes the data "B2h" into the register B0h of the tone generator control register 33a. The register B0h designates the less significant eight bits of the F number of the channel 1.

Further, the data decoder circuit 32b continues to read out the following data read out from the FIFO 31, and the read index "C0h" and the data "32h" read out in succession thereto are both tone generator control register write data, and hence sent to the register write controller 32c. The register write controller 32c prepares for writing the data "32h" into the register C0h having the address indicated by the index "C0h". In this case as well, the time management information set to the counter 32a is "00h", and hence the counter 32a instantly applies the register write-permitting signal d to the register write controller 32c, whereupon, responsive to this signal, the register write controller 32c writes the data "32h" into the register C0h of the tone generator control register 33a. The register C0h designates an octave in cooperation with the more significant two bits of the F number of the channel 1, and at the same time designates the key-on/key-off of the channel 1, and "1" is set to a bit D5 thereof (D5=1) to designate the key-on, whereby the key-on of the channel 1 is designated, to start generation of a musical tone with the tone pitch of the octave and F number, the volume, and the tone color, which are set in the tone generator control register 33a.

Then, the data decoder circuit 32b reads out the following data from the FIFO 31, and the data read out is time management information-discriminating address "FFh", and hence the time management information "50h" read out in succession thereto is set to the counter 32a as the time management information b. The data decoder circuit 32b reads out the following data from the FIFO 31, and the data read out is the index "B0h", which is tone generator control register write data, and hence sent to the register write controller 32c together with the data "B2h" read out in succession thereto. The register write controller 32c prepares for writing the data "B2h" into the register B0h having the address indicated by the index "B0h". In this case, the time management information set to the counter 32a is "50h", and hence the process waits for the counter 32a to count up to a value corresponding to "50h".

Then, the data decoder circuit 32b reads out the following data from the FIFO 31, and the data read out is the index "C0h", which is tone generator control register write data, and hence sent to the register write controller 32c together with the data "12h" read out in succession thereto. The register write controller 32c prepares for writing the data "12h" into the register C0h having the address indicated by the index "C0h". In this case, the time management information set to the counter 32a is "50h", and hence the process waits for the counter 32a to count up to the value corresponding to "50h". Then, the counting of the counter 32a progresses, and in timing a time period corresponding to "50h" has elapsed (time point 50h), the counter 32a applies the register write-permitting signal d to the register write controller 32c, whereupon, responsive to this signal, the register write controller 32c writes the data "B2h" into the register B0h of the tone generator control register 33a, and at the same time writes the data "12h" into the register C0h. The register B0h designates the less significant eight bits of the F number of the channel 1, while the register C0h designates an octave in cooperation with the more significant two bits of the F number of the channel 1, and at the same time designates the key-on/key-off of the channel 1, by the bit D5 thereof. In the present case, "0" is set to the bit D5 (D5=0) of the register C0h to designate the key-off. This instructs the key-off of the musical tone of the channel 1 being generated by the tone generator section 33 with the tone pitch of the designed octave and F number, thereby stopping the generation of the musical tone.

When the count of the counter 32a becomes equal to or larger than the value corresponding to "50h", the data decoder circuit 32b reads out the following data from the FIFO 31. The read data is time management information-discriminating address "FFh", and hence the time management information "0Ch" read out in succession thereto is set to the counter 32a as the time management information b. The data decoder circuit 32b reads out the following data from the FIFO 31, and the data read out is the index "B0h", which is tone generator control register write data, and hence sent to the register write controller 32c together with the data "8Bh" read out in succession thereto. The register write controller 32c prepares for writing the data "8Bh" into the register B0h having the address indicated by the index "B0h". In this case, the time management information set to the counter 32a is "0Ch", and hence the process waits for the counter 32a to count up to a value corresponding to "0Ch".

Then, the data decoder circuit 32b reads out the following data from the FIFO 31, and the data read out is the index "C0h", which is tone generator control register write data, and hence sent to the register write controller 32c together with the data "32h" read out in succession thereto. The register write controller 32c prepares for writing the data "32h" into the register C0h having the address indicated by the index "C0h". In this case, the time management information set to the counter 32a is "0Ch", and hence the process waits for the counter 32a to count up to a value corresponding to "0Ch". Then, the counting of the counter 32a proceeds, and in timing a time period corresponding to "0Ch" has elapsed from the time point "50h" (time point 5Ch (=50h+0Ch)), the counter 32a applies the register write-permitting signal d to the register write controller 32c, whereupon, responsive to this signal, the register write controller 32c writes the data "8Bh" into the register B0h of the tone generator control register 33a, and at the same time writes the data "32h" into the register C0h of the same. The register B0h designates the less significant eight bits of the F number of the channel 1, while the register C0h designates an octave in cooperation with the more significant two bits of the F number of the channel 1, and at the same time designates the key-on/key-off of the channel 1. In this case, "1" is set to the bit D5 (D5=1) of the register C0h to designate the key-on. This instructs the key-on of the musical tone of the channel 1, whereby the key-on of the channel 1 is designated, to start generation of a musical tone with the tone pitch of the octave and F number, the volume, and the tone color, which are set in the tone generator control register 33a.

Then, the data decoder circuit 32b continues to read out the following data from the FIFO 31. The read data is the time management information-discriminating address "FFh", and hence the time management information "20h" read out in succession thereto is set to the counter 32a as the time management information b. Then, the data decoder circuit 32b reads out the following data from the FIFO 31, and the data read out is the index "B0h", which is tone generator control register write data, and hence sent to the register write controller 32c together with the data "8Bh" read out in succession thereto. The register write controller 32c prepares for writing the data "8Bh" into the register B0h having the address indicated by the index "B0h". In this case, the time management information set to the counter 32a is "20h", and hence the process waits for the counter 32a to count "20h".

Then, the data decoder circuit 32b reads out the following data from the FIFO 31, and the data read out is the index "C0h", which is tone generator control register write data, and hence sent to the register write controller 32c together with the data "12h" read out in succession thereto. The register write controller 32c prepares for writing the data "12h" into the register C0h having the address indicated by the index "C0h". In this case, the time management information set to the counter 32a is "20h", and hence the process waits for the counter 32a to count up to the value corresponding to "20h". Then, the counting of the counter 32a progresses, and in timing the time period corresponding to "20h" has further elapsed (time point 7Ch (=5Ch+20h)), the counter 32a applies the register write-permitting signal d to the register write controller 32c, whereupon, responsive to this signal, the register write controller 32c writes the data "8Bh" into the register B0h of the tone generator control register 33a, and at the same time writes the data "12h" into the register C0h of the same. The register B0h designates the less significant eight bits of the F number of the channel 1, while the register C0h designates an octave in cooperation with the more significant two bits of the F number of the channel 1, and at the same time designates the key-on/key-off of the channel 1. In the present case, "0" is set to the bit D5 (D5=0) thereof to designate the key-off. This instructs the key-off of the musical tone of the channel 1 being generated by the tone generator section 33 with the tone pitch of the designated octave and F number, thereby stopping the generation of the musical tone.

Hereafter, data are read out one byte by one byte, and similar processing is carried out. Finally, an index "01h" and the following data "00h" are read out from the FIFO 31. Prior to the reading of these data, the time management information-discriminating address "FFh" and time management information "01h" are read out from the FIFO 31. The time management information "01h" is set to the counter 32a as the time management information k, and the index read out in succession thereto is sent to the register write controller 32c as the tone generator control register write data c. Further, the data decoder circuit 32b sends the data "00h" read out next to the register write controller 32c. The register write controller 32c prepares for writing the data "00h" ("00000000" in binary notation) to the register 01h having the address indicated by the index "01h". In this case, the time management information set to the counter 32a is "01h", and hence the process waits for the counter 32a to count up to the value corresponding to "01h". The counting of the counter 32a progresses and in timing the time period corresponding to "01h" has elapsed, the counter 32a applies the register write-permitting signal d to the register write controller 32c, whereupon, responsive to this signal, the register write controller 32c writes the data "00h" into the register 01h arranged in the sequencer 32. The bit D0 of the register 01h instructs the start/stop of the operation of the sequencer 32, and in this case, "0" is set to the bit D0 of the register 01h (D0=0) to designate the stop of operation of the sequencer 32. This instructs the sequencer 32 to terminate its operation, whereby the sequencer 32 stops its operation. As described above, this pair of data, index "01h" and "00h", is the sequencer terminating data.

Figure 11:
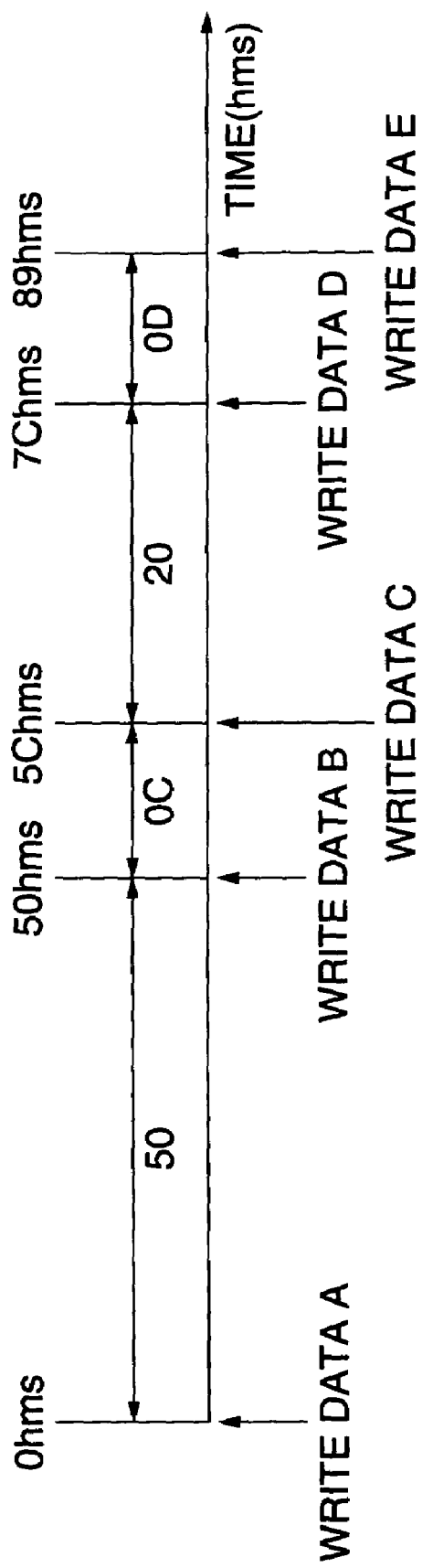
FIG. 11 is a timing chart showing timing in which the hardware tone generator control data having the first data structure are written by the musical tone-generating apparatus according to the first embodiment.

FIG. 11 is a timing chart showing timing of writing data into the tone generator control register 33a.

In FIG. 11, the abscissa designates time which is measured by 1 millisecond as units of the reference time. However, values of time are denoted in hexadecimal notation, and to indicate the method of denotation, time units are represented by hms. First, at a time point 0 hms the counter 32a starts counting, the data associated with the time management information "00h" are written into the tone generator control register 33a. In this case, the written data are five pairs of tone generator control register write data A, i.e. the index "FFh" to the data "32h", shown in FIG. 10. Thereafter, when it is a time point 50 hms after the lapse of 50 hms, the data following the time management information "50h", which is the next time management information to "00h", are written into the tone generator control register 33a. In this case, the written data are two pairs of tone generator control register write data B, i.e. the index "B0h" to the data "12h", shown in FIG. 10.

Further, when it is a time point 5C hms after the lapse of 0C hms, the data following the time management information "0Ch", which is the next time management information to "50h", are written into the tone generator control register 33a. In this case, the written data are two pairs of tone generator control register write data C, i.e. the index "B0h" to the data "32h", shown in FIG. 10. Further, when it is a time point 7C hms after the lapse of 20 hms, the data following the time management information "20h", which is the next time management information to "0Ch", are written into the tone generator control register 33a. In this case, the written data are two pairs of tone generator control register write data D, i.e. the index "B0h" to the data "12h", shown in FIG. 10. Further, when it is a time point 89 hms after the lapse of 0D hms, the data following the time management information "0Dh", which is the next time management information to "20h", are written into the tone generator control register 33a. In this case, the written data are four pairs of tone generator control register write data E, i.e. the index "B3h" to the data "32h", shown in FIG. 10.

Although not shown in FIG. 10, the following data are written into the tone generator control register 33a in the same manner as described above, until finally the sequencer terminating data formed by the index "01h" and the data "00h" are written into the register 01h arranged in the sequencer 32, as described hereinabove. In this case, the counting of the counter 32a is also stopped. If the reproduction of musical tones is instructed thereafter, the counter 32a is cleared, and then newly starts counting.

Thus, data following time management information are sequentially written into the tone generator control register 33a until the next time management information is read out. Further, parameters for generation of musical tones are written into the tone generator control register 33a in timing shown in FIG. 11, so that musical tones are generated in timing shown in FIG. 5.

Figure 12:
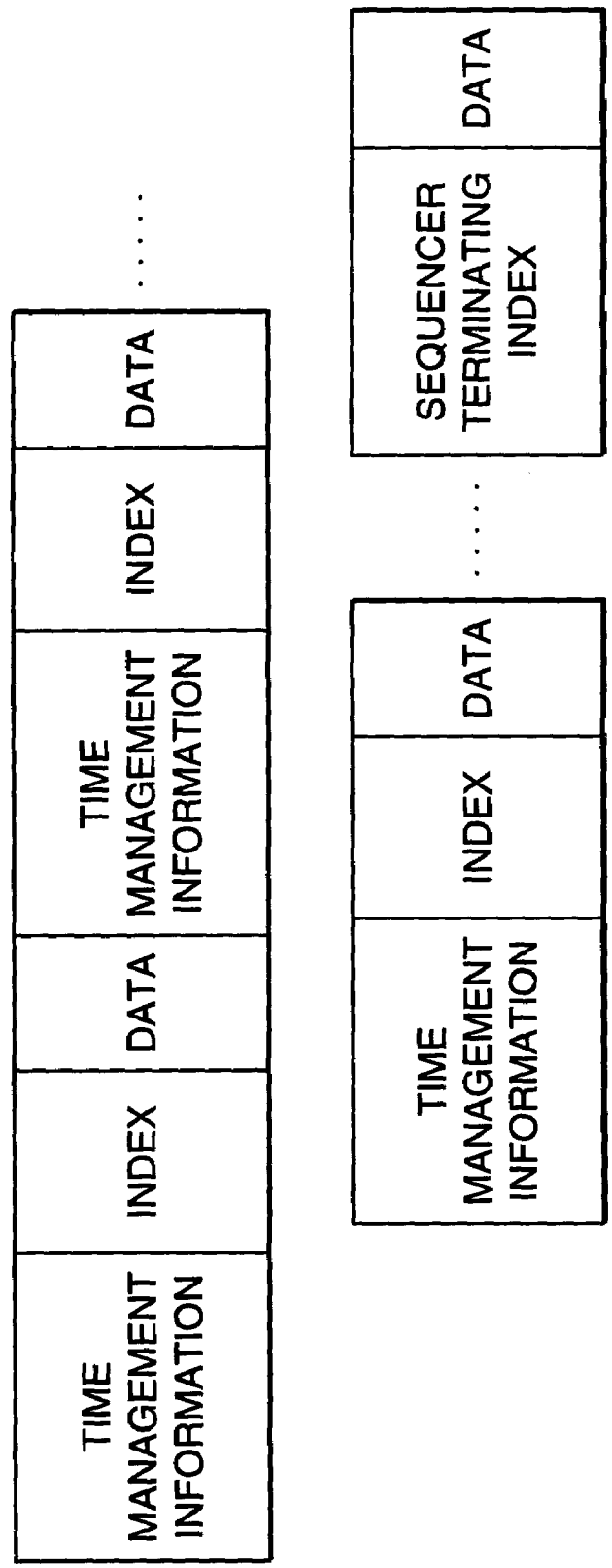
FIG. 12 is a diagram showing a second data structure of the hardware tone generator control data, used in the musical tone-generating apparatus according to the first embodiment.
Figure 13:
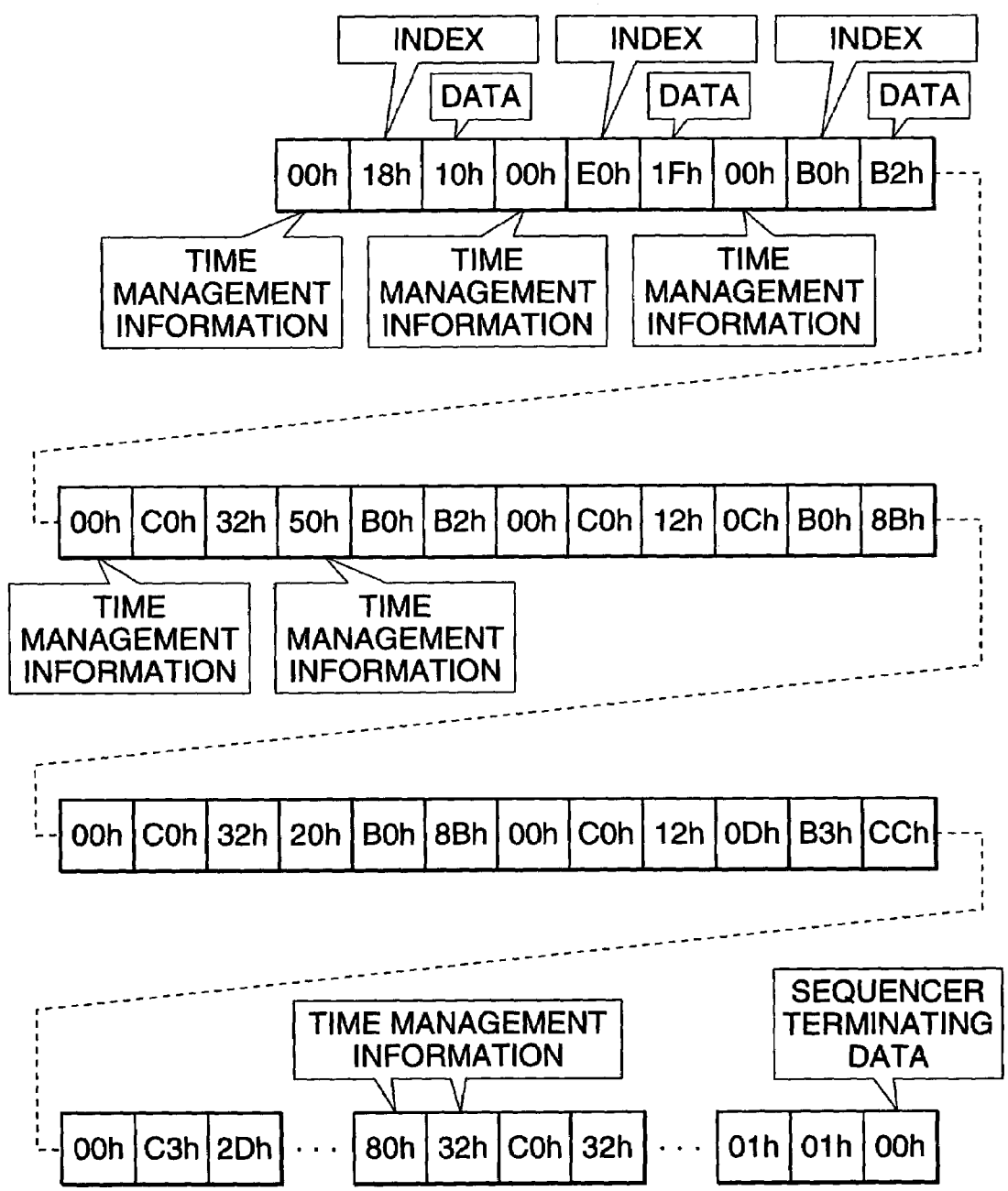
FIG. 13 is a diagram showing an example of the hardware tone generator control data having the second data structure used in the musical tone-generating apparatus according to the first embodiment.

Next, an example of a second data structure of the hardware tone generator control data formed by conversion of the hardware tone generator control data-generating means 10b is shown in FIG. 12, and an example of the hardware tone generator control data having the second data structure corresponding to the FIG. 6 SMAF data is shown in FIG. 13. Further, the FIG. 13 hardware tone generator control data rearranged in sets of data is shown in FIG. 14.

In the second data structure, as shown in FIG. 12, the hardware tone generator control data are each formed by a set of time management information, index, and data. That is, in this data structure, an index is provided immediately before data, and time management information is provided immediately before the index. The index is one-byte information as described above, which indicates the address of a corresponding one of the registers provided in the tone generator control register 33a, and the data, which is one byte, following the index is written into the register having the address. Further, timing in which the data is written into the register is indicated by one byte or two bytes of time management information. When the time management information is formed by two bytes, the MSB (most significant bit) of the first byte thereof is set to "1". Further, as is distinct from the first data structure, in the second data structure, the time management information is necessarily provided immediately before the index. Thus, the hardware tone generator control data having the second data structure are constituted by sets of data, each set having three bytes or four bytes, and time management information is arranged at the head of each set of data.

FIG. 13 shows an example of the hardware tone generator control data having the second data structure which is formed by the hardware tone generator control data-generating means 10b through interpretation and conversion of the SMAF data. As shown in the figure, the hardware tone generator control data having the second data structure is composed of data each formed by a set of time management information, an index, and data. FIG. 14 shows the rearrangement of the FIG. 13 hardware tone generator control data having the second data structure according to the sets of data. Hereafter, the reproduction of a musical piece based on hardware tone generator control data having the second data structure will be described with reference to these figures and FIG. 2. It is assumed, however, that the SMAF data has been converted by the CPU 10 into the hardware tone generator control data and the resulting data has been stored in the area 11b of the RAM 11 prior to the reproduction of the musical piece.

The memory controller 10a of the CPU 10 reads out hardware tone generator control data f shown in FIG. 14, which corresponds to the musical piece designated for reproduction and has the second data structure, from the area 11b of the RAM 1, e.g. by an amount of 32 bytes, and transfers the same to the FIFO 31 of the hardware tone generator 15. Simultaneously, the CPU supplies the sequencer start signal g to the counter 32a of the sequencer 32.

Further, the sequencer start signal g is written into the register 01h as part of the tone generator control register 33a to set "1" to the bit D0 (start) thereof, thereby instructing the start of sequencer operation. This causes the sequencer 32 to start the sequencer operation, and responsive to the sequencer start signal g, the counter 32a starts counting of clocks as units of the reference time, and at the same time applies the data decode start signal a to the data decoder circuit 32b. Responsive to the data decode start signal a, the data decoder circuit 32b reads data from the FIFO 31 one byte by one byte. In this case, the first data read out is time management information, and this data "00h" is set to the counter 32a as time management information b. In this case, the MSB of the time management information is "0", and hence this set of data amounts to a total of three bytes.

The index "18h" read out and the data "10h" read out in succession thereto are both tone generator control register write data, and hence sent to the register write controller 32c. The register write controller 32c prepares for writing the data "10h" into the register 18h having the address indicated by the index "18h". In this case, the time management information set to the counter 32a is "00h", and hence the counter 32a instantly applies the register write-permitting signal d to the register write controller 32c, whereupon, responsive to this signal, the register write controller 32c writes the data "10h" into the register 18h having the address indicated by the index "18h". The register 18h designates the tone cooler numbers of the channels 1 and 2, so that the tone colors of the channels 1 and 2 of musical tones generated from the tone generator section 33 are designated.

Further, the data decoder circuit 32b continues to read the following set of data from the FIFO 31, and the first data of the set read out is time management information "00h", which is set to the counter 32a as the time management information b. In this case, the MSB of the time management information is "0", and hence this set of data also amounts to a total of three bytes. The index "E0h" read out and the data "1Fh" read out in succession thereto are both tone generator control register write data, and hence sent to the register write controller 32c. The register write controller 32c prepares for writing the data "1Fh" into the register E0h having the address indicated by the index "E0h". In this case as well, the time management information set to the counter 32a is "00h", and hence the counter 32a instantly applies the register write-permitting signal d to the register write controller 32c, whereupon, responsive to this signal, the register write controller 32c writes the data "1Fh" into the register E0h of the tone generator control register 33a. The register E0h designates the channel volume of the channel 1, so that the channel volume of the channel 1 of a musical piece generated by the tone generator section 33 is designated.

Further, the data decoder circuit 32b continues to read the following set of data from the FIFO 31, and the first data of the set read out is time management information "00h", which is set to the counter 32a as the time management information b. In this case, the MSB of the time management information is "0", and hence this set of data also amounts to a total of three bytes. The index "B0h" read out and the data "B2h" read out in succession thereto are both tone generator control register write data, and hence sent to the register write controller 32c. The register write controller 32c prepares for writing the data "B2h" into the register B0h having the address indicated by the index "B0h". In this case as well, the time management information set to the counter 32a is "00h", and hence the counter 32a instantly applies the register write-permitting signal d to the register write controller 32c, whereupon, responsive to this signal, the register write controller 32c writes the data "B2h" into the register B0h of the tone generator control register 33a. The register B0h designates the less significant eight bits of the F number of the channel 1.

Further, the data decoder circuit 32b continues to read the following set of data from the FIFO 31, and the first data of the set read out is time management information "00h", which is set to the counter 32a as the time management information b. In this case, the MSB of the time management information is "0", and hence this set of data also amounts to a total of three bytes. The index "C0h" read out and the data "32h" read out in succession thereto are both tone generator control register write data, and hence sent to the register write controller 32c. The register write controller 32c prepares for writing the data "32h" into the register C0h having the address indicated by the index "C0h". In this case as well, the time management information set to the counter 32a is "00h", and hence the counter 32a instantly applies the register write-permitting signal d to the register write controller 32c, whereupon, responsive to this signal, the register write controller 32c writes the data "32h" into the register C0h of the tone generator control register 33a. The register C0h designates an octave in cooperation with the more significant two bits of the F number of the channel 1, and at the same time designates the key-on/key-off of the channel 1, and "1" is set to a bit D5 thereof (D5=1) to designate the key-on, whereby the key-on of the channel 1 is designated, to start generation of a musical tone via the channel 1 with the tone pitch of the octave and F number, the volume, and the tone color, which are set in the tone generator control register 33a.

Further, the data decoder circuit 32b continues to read the following set of data from the FIFO 31, and the first data of the set read out is time management information "50h", which is set to the counter 32a as the time management information b. In this case, the MSB of the time management information is "0", and hence this set of data also amounts to a total of three bytes. Then, the data decoder circuit 32b reads out the following data from the FIFO 31. The data read out is the index "B0h", which is tone generator control register write data, and hence sent to the register write controller 32c together with the data "B2h" read out in succession thereto. The register write controller 32c prepares for writing the data "B2h" into the register B0h having the address indicated by the index "B0h". In this case, the time management information set to the counter 32a is "50h", and hence the process waits for the counter 32a to count a value corresponding to "50h".

Then, the counting of the counter 32a progresses, and in timing a time period corresponding to "50h" has elapsed (time point 50h), the counter 32a applies the register write-permitting signal d to the register write controller 32c, whereupon, responsive to this signal, the register write controller 32c writes the data "B2h" into the register B0h of the tone generator control register 33a. The register B0h designates the less significant eight bits of the F number of the channel 1.

Then, the data decoder circuit 32b continues to read out the following set of data from the FIFO 31, and the first data of the set read out is time management information "00h", which is set to the counter 32a as the time management information b. In this case, the MSB of the time management information is "0", and hence this set of data also amounts to a total of three bytes. The data read out is the index "C0h", which is tone generator control register write data, and hence sent to the register write controller 32c together with the data "12h" read out in succession thereto. The register write controller 32c prepares for writing the data "12h" into the register C0h having the address indicated by the index "C0h". In this case, the time management information set to the counter 32a is "00h", and hence the counter 32a instantly applies the register write-permitting signal d to the register write controller 32c. The register write controller 32c operates in response to this signal to write the data "12h" into the register the register C0h of the tone generator control register 33a. The register C0h designates an octave in cooperation with the more significant two bits of the F number of the channel 1, and at the same time designates the key-on/key-off of the channel 1. In the present case, "0", is set to the bit D5 (D5=0) thereof to designate the key-off. This instructs the key-off of the musical tone of the channel 1 being generated by the tone generator section 33 with the tone pitch of the octave and F number designed by the two sets of data, thereby stopping the generation of the musical tone.

It should be noted that the time management information "50h" which designates the key-off corresponds to the gate time of the SMAF data.

Hereafter, whenever each set of data is read out, the data is written into the tone generator control register 33a. Let it be assumed that the first data of a set of data read out by the data decoder circuit 32b from the FIFO 31 is time management information "80h". In this case, the MSB of the time management information is "1", which means that the time management information of this set of data is expressed by two bytes. Therefore, the following time management information "32h" is read out in succession and the data read out "80h" and "32h" are set to the counter 32a as the time management information b. In this case, this set of data amounts to a total of four bytes. The data decoder circuit 32b reads out the following data from the FIFO 31, and the data read out is the index "C0h", which is tone generator control register write data, and hence sent to the tone generator control register 32a together with the data "32h" read in succession thereto. The register write controller 32c prepares for writing the data "32h" into the register C0h having the address indicated by the index "C0h". In this case, the time management information set to the counter 32a is "80h 32h", and hence the process waits for the counter 32a to count up to a value corresponding to (80h 32h).

Then, the counting of the counter 32a progresses, and in timing a time period corresponding to "80h 32h" has elapsed, the counter 32a applies the register write-permitting signal d to the register write controller 32c, whereupon, responsive to this signal, the register write controller 32c writes the data "32h" into the register C0h of the tone generator control register 33a. The register C0h designates an octave in cooperation with the more significant two bits of the F number of the channel 1, and at the same time designates the key-on/key-off of the channel 1. In the present case, "1" is set to the bit D5 (D5=1) to designate the key-on.

Hereafter, data is read out one byte by one byte, and similar processing is carried out. Finally, a set of time management information "01h", the index "01h" and the data "00h", are read out from the FIFO 31. The time management information "01h" is set to the counter 32a as the time management information b, and the index "01h" read out in succession thereto is sent to the register write controller 32c as the tone generator control register write data c. Further, the data decoder circuit 32b sends the data "00h" read out in succession thereto to the register write controller 32c. The register write controller 32c prepares for writing the data "00h" ("00000000" in binary notation) into the register 01h having the address indicated by the index "01h". In this case, the time management information set to the counter 32a is "01h", and hence the process waits for the counter 32a to count up to a value corresponding to "01h". The counting of the counter 32a progresses and in timing a time period corresponding to "01h" has elapsed, the counter 32a applies the register write-permitting signal d to the register write controller 32c, whereupon, responsive to this signal, the register write controller 32c writes the data "00h" into the register 01h arranged in the sequencer 32. The bit D0 of the register 01h instructs the start/stop of the operation of the sequencer 32, and in this case, "0" is set to the bit D0 of the register 01h (D0=0) to designate the stop of operation of the sequencer 32. This instructs the sequencer 32 to terminate its operation, whereby the sequencer 32 stops its operation. As described above, this pair of data, the index "01h" and the data "00h", provide the sequencer terminating data.

Figure 15:
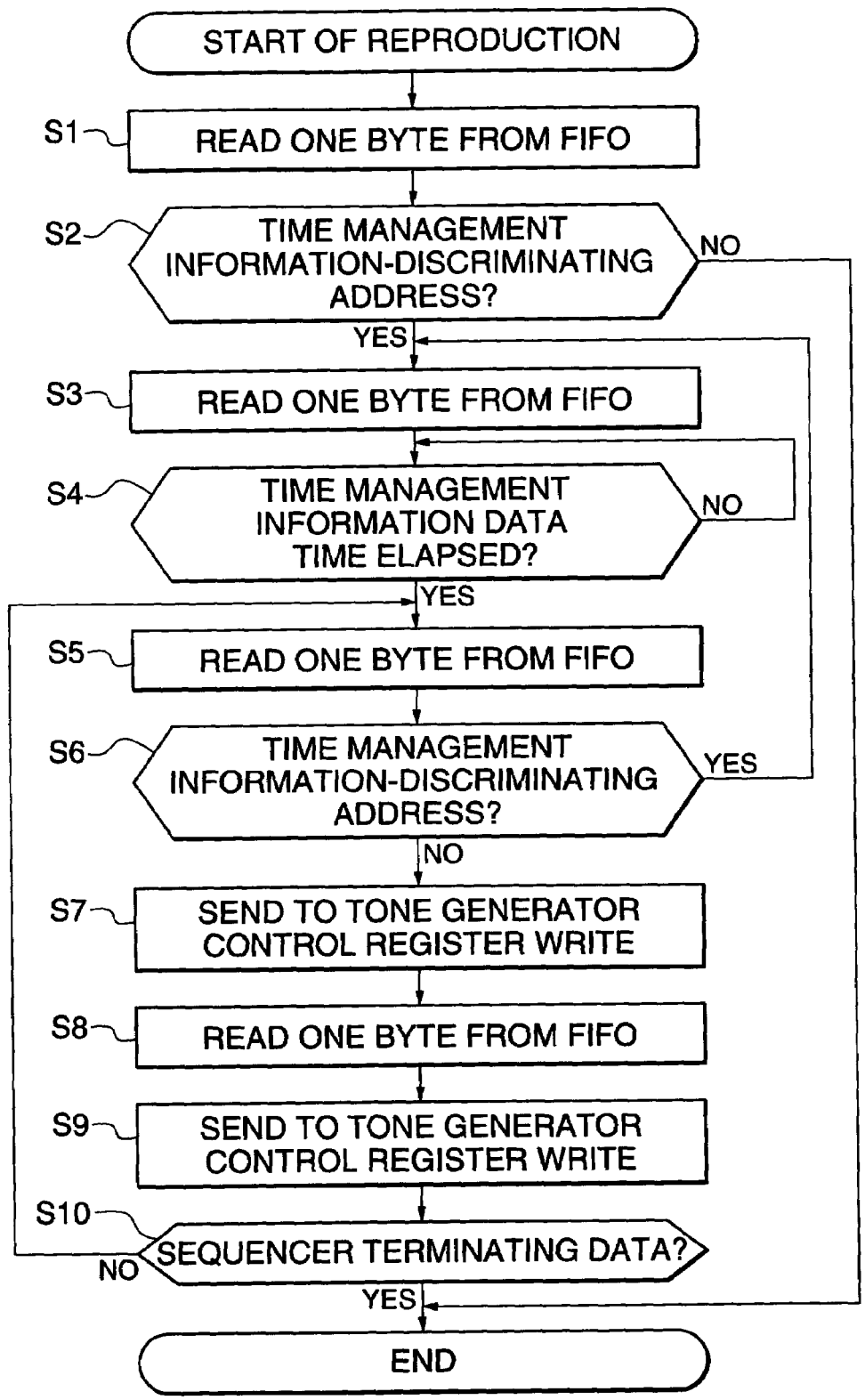
FIG. 15 is a flowchart showing a reproduction process executed by a sequencer of a hardware tone generator of the musical tone-generating apparatus according to the first embodiment, for reproducing the tone generator control register data having the first data structure.

Next, FIG. 15 is a flowchart showing a reproduction process carried out by the sequencer 32 of the hardware tone generator 15, for reproducing the tone generator control register data having the first data structure.

Referring to the FIG. 15 flowchart, when the CPU 10 applies the sequencer start signal g to the sequencer 32, the reproduction process is started, and at a step S1, the data decoder circuit 32b reads out a first byte from the FIFO 31. Then, at a step S2, the data decoder circuit 32b determines whether or not the read data is a time management information-discriminating address. If the first data is FFh, and hence the time management information-discriminating address, the answer to this question is affirmative (YES), and hence the process proceeds to a step S3, wherein the decoder circuit 32b reads out the following one byte of data from the FIFO 31. Since the read data is time management information, it is set to the counter 32a. Then, at a step S4, it is determined whether or not a time period indicated by the time management information set to the counter 32a has elapsed. If the time period has not elapsed, the process waits for the time period to elapse, and when it is determined that the time period has elapsed, the process proceeds to a step S5. It should be noted that it is determined that the time period has elapsed when the count of the counter 32a becomes equal to or larger than a value indicated by the time management information.

At the following step S5, the data decoder circuit 32b reads out another subsequent byte of data from the FIFO 31. Then, the data decoder circuit 32b determines at a step S6 whether or not the read data is the time management information-discriminating address. If it is determined here that the read data is not the time management information-discriminating address (FFh), the process proceeds to a step S7, wherein the read data is sent to the tone generator control register 33a. However, this data is an index, which designates the address of a register provided in the tone generator control register 33a. Then, at a step S8, the data decoder circuit 32b reads out another subsequent byte of data from the FIFO 31, and the read data forms a pair with the index sent at the step S7, and at a step S9, the data is written into a register of the tone generator control register 33a designated by the index. For instance, at the start of the reproduction, the first data sent to the tone generator register 33a are the pair constituted by the index 18h and the data "10h" in the case of the example shown in FIGS. 9 and 10.

Then, it is determined at a step S10 whether or not the two bytes of read data provide the sequencer terminating data. The sequencer terminating data is defined as data formed by the index 01h and the data "00h", as shown in FIGS. 9 and 10. If the read data are the pair of the index 01h and the data "00h", it is determined that the read data provide the sequencer terminating data, and the reproduction process is terminated. Further, if it is determined that the read data do not provide the sequencer terminating data, the process returns to the step S5, wherein the data decoder circuit 32b reads out a still another subsequent byte of data from the FIFO 31. Then, the data decoder circuit 32b determines, at the step S6, whether or not the read data is the time management information-discriminating address. If it is determined that the read data is the time management information-discriminating address (FFh), the process returns to the step S3, wherein the data decoder circuit 32b reads out a still another subsequent byte of data from the FIFO 31. The data read out this time is the time management information, which is then set to the counter 32a. Then, it is determined at the step S4 whether or not a time period indicated by the time management information set to the counter 32a at the step S4 has elapsed. If the answer to this question is negative (NO), the process waits for the time period to elapse, and when it is determined that the time period has elapsed, the process proceeds to the step S5.

Hereafter, similar processing is carried out, and if it is determined at the step S10 that the read data provide the sequencer terminating data, the reproduction process is terminated. In this case, the sequencer terminating data has been written into the tone generator control register 33a through the steps S7 and S9 before the step S10. Therefore, in this case, the reproduction process is terminated at the sequencer 32. It should be noted that since the process can return from the step S10 to the step S5, a plurality of data read in before the time management information-discriminating address is read in can be sent to the tone generator control register 33a by a single piece of time management information. By sending these data, the tone generator section 33 can be controlled in respect of the key-on/key-off, the pitch of a musical tone to be sounded, the volume, the tone color, and so forth. Further, if the data decoder circuit 32b determines at the step S2 that the read data is not the time management information-discriminating address, it is determined that the data does not belong to the tone generator control register data having the first data structure, followed by terminating the reproduction process. Further, although not shown in the flowchart, also when an error of reading data from the FIFO 31 occurs, the reproduction process is terminated.

Figure 16:
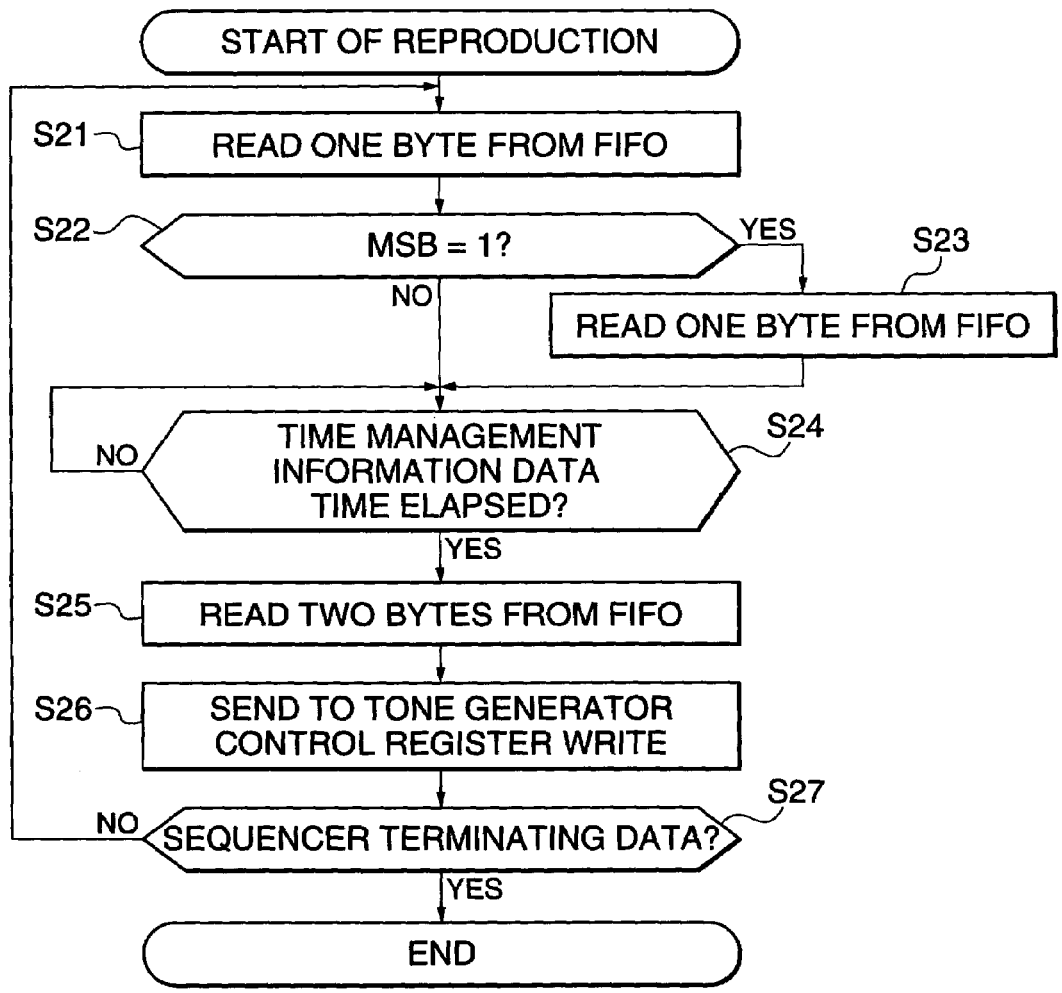
FIG. 16 is a flowchart showing a reproduction process executed by the sequencer of the hardware tone generator of the musical tone-generating apparatus according to the first embodiment, for reproducing the tone generator control register data having the second data structure.

Next, FIG. 16 is a flowchart showing a reproduction process carried out by the sequencer 32 of the hardware tone generator 15, for reproducing the tone generator control register data having the second data structure.

Referring to the FIG. 16 flowchart, when the CPU 10 applies the sequencer start signal g to the sequencer 32, the reproduction process is started, and at a step S21, the data decoder circuit 32b reads out a first byte from the FIFO 31. Then, at a step S22, it is determined whether or not the MSB of the read data is "1". If it is determined that the MSB of the read data is "1", it is determined that time management information is formed by two bytes, and the process proceeds to a step S23, wherein the data decoder circuit 32b reads out the following one byte of data from the FIFO 31. The read time management information composed of two bytes is set to the counter 32a. On the other hand, if it is not determined that the MSB of the read data is not "1", the read one byte of time management information is set to the counter 32a. Then, at a step S24, it is determined whether or not a time period indicated by the time management information set to the counter 32a has elapsed. If it is determined that the time period has not elapsed, the process waits for the time period to elapses, whereas if it is determined that the time period has elapsed, the process proceeds to a step S25. It should be noted that it is determined that the time period has elapsed when the count of the counter 32a becomes equal to or larger than a value indicated by the time management information set to the counter 32a.

At the step S25, the data decoder circuit 32b reads out another subsequent byte of data from the FIFO 31. The read two bytes are data following the time management information, and as shown in FIG. 12, provide an index and data, respectively. Accordingly, the read two bytes are sent to the tone generator control register 33a. In this case, the data following the index is written into a register of the tone generator control register 33a designated by the index. For instance, at the start of the reproduction, the first data sent to the tone generator control register 33a are, in the example shown in FIGS. 13 and 14, a pair of data formed by the index 18h and the data "10h".

Then, it is determined at a step S27 whether or not the two bytes of data read at the step S25 are the sequencer terminating data. The sequencer terminating data are, as described above, formed by a pair of the index 01h and the data "00h", as shown in FIGS. 13 and 14. Therefore, if the pair of read data are the index 01h and the data "00h", it is determined that they are the sequencer terminating data, followed by terminating the reproduction process. On the other hand, if it is determined that the read two bytes are not the sequencer terminating data, the process returns to the step S21, and the processing described above is repeatedly carried out.

Thus, data each formed by a set of three bytes or four bytes are sequentially read out, and the index and data of each set of data are sequentially sent to the tone generator control register 33a, whereby the data is written into a register corresponding to the index. This causes the tone generator section 33 to generate musical tones based on the data written into the tone generator control register 33a. It should be noted that if it is determined at the step S27 that the read data provide the sequencer terminating data, the reproduction process is terminated. In this case, however, at the step S26 before the step S27, the sequencer terminating data has been written into the tone generator control register 33a. Therefore, the reproduction process is terminated at the sequencer 32.

As described above, in the reproduction process by the sequencer 32 of the hardware tone generator 15, time management and the transfer of data to the tone generator control register 33a are carried out. Further, the time management is carried out by separating the time management information from the hardware tone generator control data read out from the FIFO 31 to set the same to the counter 32a, and monitoring a result of comparison between a value indicated by the set time management information and the count of the counter 32a. This makes it possible to simplify the construction of hardware for time management, and also reduce the size of the circuit therefor. Further, data can be sent to the tone generator control register 33a, simply in response to the register write-permitting signal delivered when the count of the counter 32a becomes equal to or larger than the value indicated by the time management information. This also makes it possible to simplify the construction of hardware therefor, and reduce the size of the circuit of the sequencer 32.

It should be noted that the sequencer start signal g causes the counter 32a to start counting, and at the same time, sets "1" to the bit D0 (start) of the register 01h as part of the tone generator control register 33a. In this case, a level signal may be used as the sequencer start signal g, whereby the apparatus may be configured such that the counting of the counter 32a is started depending on the level of the sequencer start signal g, and at the same time "1" is set to the D0 of the register 01h. Alternatively, the sequencer start signal g may contain data formed by the index "01h" and data "01h", and by this data, "1" may be set to the D0 (start) of the register 01h.

Figure 17:
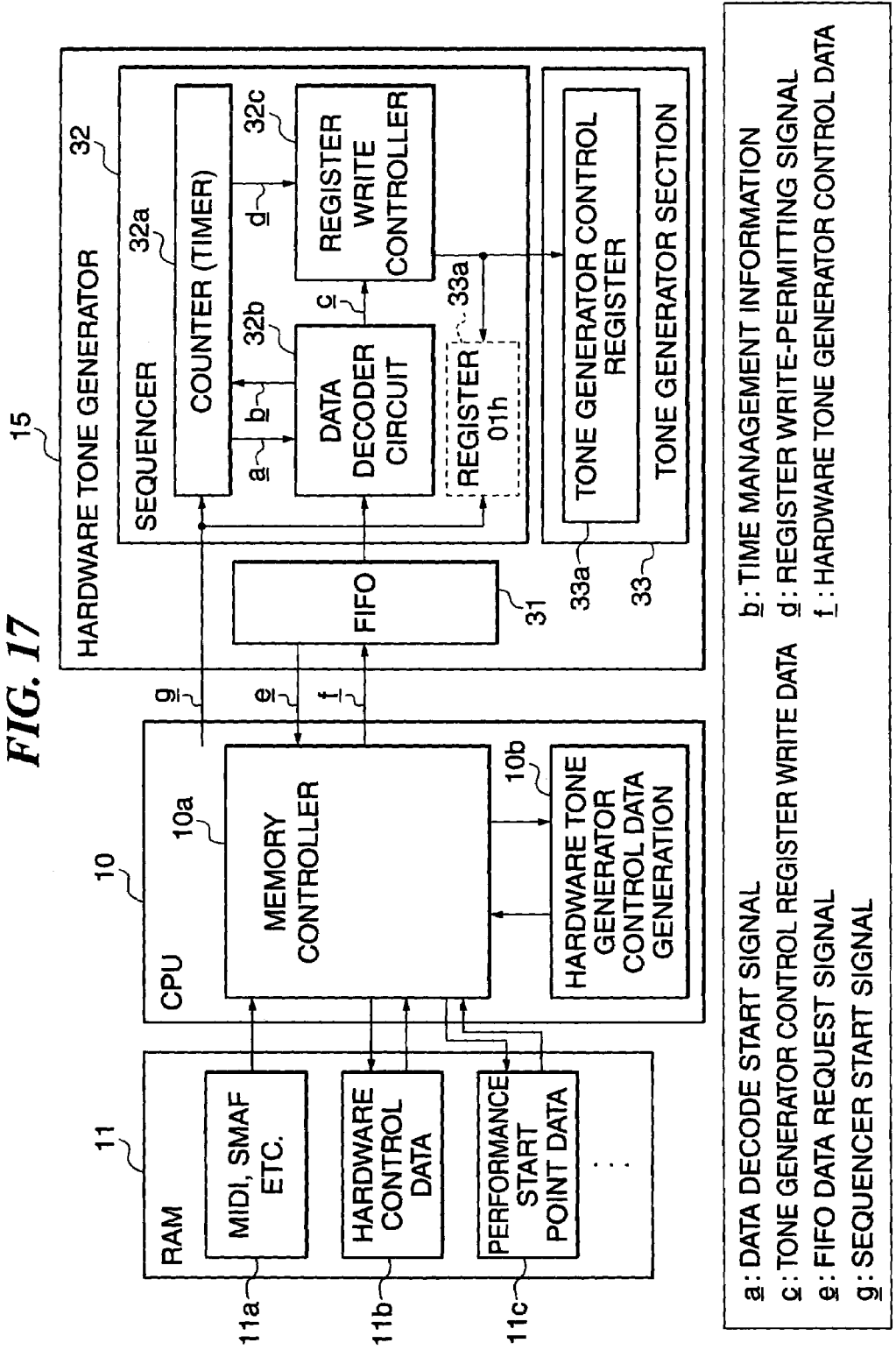
FIG. 17 is a diagram illustrating a musical tone-generating apparatus according to a second embodiment of the present invention.

Next, FIG. 17 shows the arrangement of a musical tone-generating apparatus according to a second embodiment of the invention, which is capable of reproducing a musical piece starting with a desired point thereof, and incorporated in a cellular phone 1 according to the second embodiment.

The musical tone-generating apparatus shown in FIG. 17 includes a register area 11c provided in the RAM 11. The register area 11c stores performance start point data indicative of a performance start point from which the reproduction of a musical piece is started. This embodiment is distinguished in configuration from the FIG. 2 musical tone-generating apparatus according to the first embodiment in this respect. Therefore, in the following, the description will be given only of this configuration which distinguishes the present embodiment from the first embodiment.

The register area in the RAM 11 stores the performance start point data indicative of a performance start point from which reproduction of a musical piece is to be started. The present apparatus is configured such that the user can configure the performance start point data as he desires. This data is configured from a menu provided in the cellular phone 1 by setting a point of a musical piece selected as an incoming call music or a music-on-hold, from which the reproduction of the musical piece is started. In this case, the performance start point may be set by inserting a plurality of marks in music contents data or hardware tone generator control data converted from the music contents data at respective points suitable for starting the performance of the musical piece, in advance, and selecting one of the points indicated by the marks as the start point. The points where the marks are inserted are e.g. respective heads of an introduction, a main, a fill-in, a bridge, an ending, etc. of the musical piece. Then, the CPU 10 causes the hardware tone generator control data-converting means 10b to convert the music contents data of the selected musical piece to hardware tone generator control data. The converted hardware tone generator control data are stored in the area 11b of the RAM11.

If the reproduction is instructed at this time, the CPU 10 reads out the performance start point data stored in the register area 11c of the RAM 11, and starts to read hardware tone generator control data in the area 11b of the RAM 11, starting with a point corresponding to the performance start point data, followed by sequentially sending the read data to the hardware tone generator 15. The tone generator 33 starts generation of musical tones stating with a point indicated by the performance start point data, based on the received hardware tone generator control data. It should be noted that if there exist setup data, such as tone color data, tempo data and volume data, at the head of the music contents data, the setup data are also converted to the hardware tone generator control data and stored in advance in the area 11b of the RAM 11. Then, when the reproduction of the musical piece is instructed, first, the hardware tone generator control data corresponding to the setup data are read out from the area 11b, and transferred to the hardware tone generator 15. In succession thereto, the hardware tone generator control data are read out starting with the point indicated by the performance start point data, and sequentially transferred to the hardware tone generator 15. This makes it possible to reproduce a musical piece in the tone color, tempo, and volume set thereto even when the musical piece is reproduced from an intermediate point thereof.

Now, if the stoppage of the reproduction of a musical piece is instructed by operating an incoming call button or the like, information of a terminating point is stored so as to enable the reproduction of the musical piece to be resumed next time from a point at which the reproduction of the musical piece was terminated. In this case, if the performance start point data is set to a first one of start points indicated by respective ones of the above-mentioned marks and located at respective positions following the point at which the reproduction of the musical piece was terminated, the performance of the musical piece can be resumed at a suitable point. It should be noted that the stoppage of the reproduction is instructed when the incoming call button of the input section 17 of the cellular phone is operated, the operation for canceling a call hold is carried out, or when the connection of the communication line is cut off.

As described above, as the performance start point data stored in the register area 11c, there are used address data of respective performance start points set to the tone generator hardware control data converted from the music contents data. This makes it possible to dispense with the need of converting the music contents data from the performance start point, to the hardware tone generator control data each time the performance start point is changed.

Further, when the cellular phone 1 is reset, the performance start point data stored in the register area 11c of is initialized. Further, when a change in incoming call music is instructed as well, the performance start point data stored in the register area 11c of is initialized.

Figure 18:
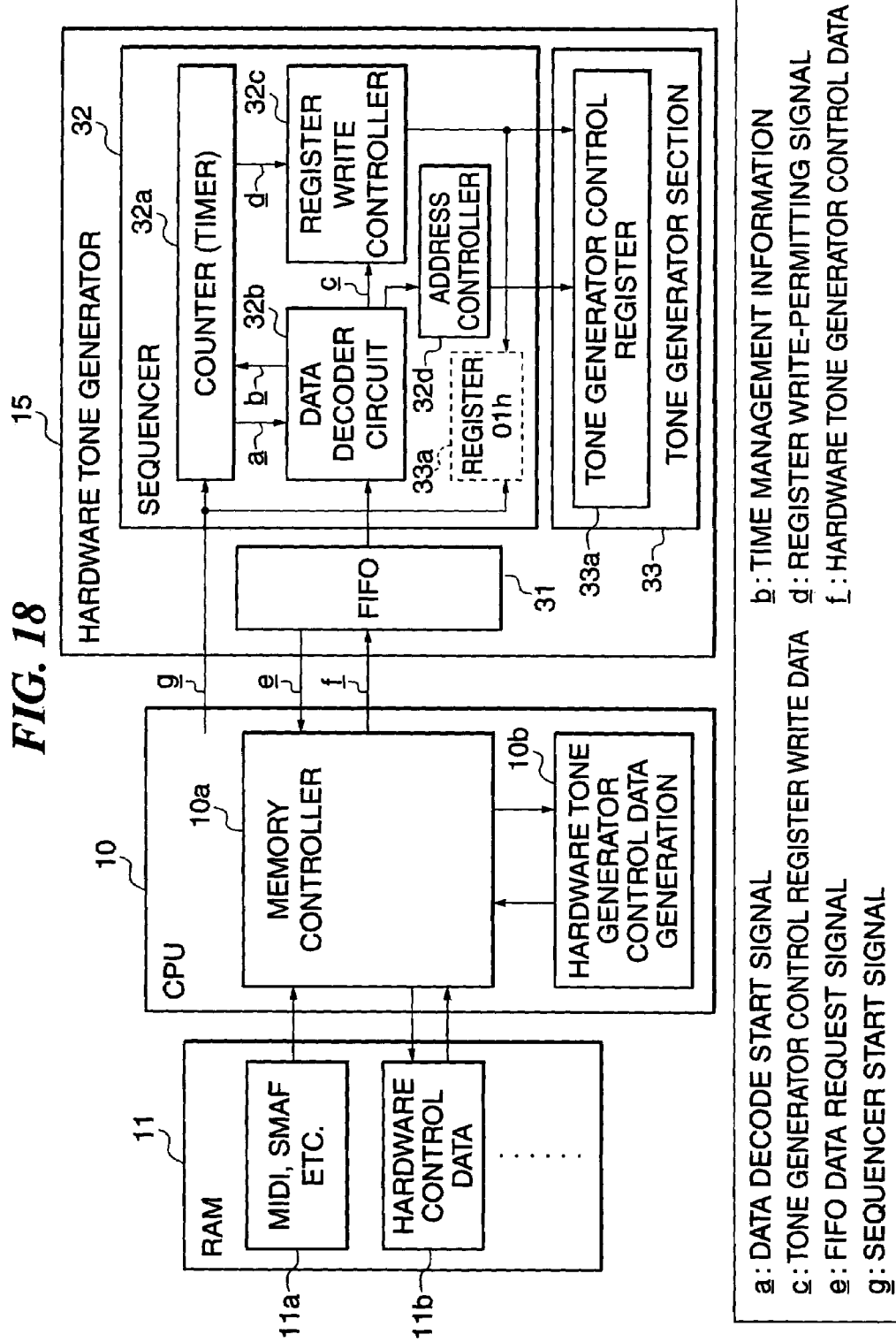
FIG. 18 is a diagram illustrating a musical tone-generating apparatus according to a third embodiment of the present invention.

Next, FIG. 18 shows a musical tone-generating apparatus according to a third embodiment, which is incorporated in a cellular phone 1 according to the third embodiment. The musical tone-generating apparatus shown in FIG. 18 is capable of reducing the amount of converted hardware tone generator control data, and the present embodiment is distinguished from the FIG. 2 musical tone-generating apparatus according to the first embodiment in this respect. Therefore, in the following, the description will be given only of this configuration which distinguishes the present embodiment from the first embodiment.

In the FIG. 18 musical tone-generating apparatus according to the third embodiment, the RAM 11 stores MID data, SMAF data and the like, formed as files, in an area 11*a* thereof. Further, when the CPU 10 has extra capability of processing or available processing time, the CPU 10 reads out musical contents data from the area 11*a* of the RAM 11 and carries out a converting process for converting the read data to hardware tone generator control data, to store the converted hardware tone generator control data in an area 11*b* of the RAM 11. The area 11*a* can store musical contents data of a plurality of musical pieces, and the area 11*b* can also store hardware tone generator control data of a plurality of musical pieces.

Now, FIG. 19 shows an example (third example) of hardware tone generator control data converted by the FIG. 18 musical tone-generating apparatus from SMAF data. As shown in this figure, the hardware tone generator control data is formed of time management information corresponding to duration and gate time, and tone generator control register write data. The index is information, as described hereinabove, which indicates an address of each register provided in the tone generator control register 33*a*, and the data following the index is written into the register indicated by the address. The FIG. 18 musical tone-generating apparatus is characterized in that as shown in a second line of hardware tone generator control data shown in FIG. 19, the index can be represented by a plurality of bytes (two bytes in the illustrated example), and data can be expressed by a plurality of bytes (three bytes in the illustrated example), and further, as shown in a third line of the same, time management information can be represented by a plurality of bytes (two bytes in the illustrated example).

The time manage information is configured such that it can be represented by a plurality of bytes for the purpose of extending the range of duration data indicative of time intervals between events and gate time data indicative of a time period over which the musical tone is sounded. For instance, if the time management information is represented by one byte, only the range of values of 0 to 225 can be expressed, so that only a range of time of 0 to 255 milliseconds can be expressed assuming that time is expressed in units of one millisecond. To eliminate this inconvenience, if the time management information is represented by two bytes, the range of values of 0 to 65535 ($=2^{16}-1$) can be expressed, so that a range of time of 0 to 65535 milliseconds can be expressed. However, in the FIG. 18 third embodiment, the MSB of each byte is used to indicate whether or not there is a continued byte, so that the number of bits which can be used for expression of time is the remaining seven bits less significant than the MSB, so that a range of values of 0 to 163383 ($2^{14}-1$) can be expressed. Further, if the time management information is configured such that it can be represented by the maximum three bytes, it is possible to express a time period longer than the range of 0 to 16383 milliseconds.

Further, the index is configured such that it can be represented by a plurality of bytes for the following reasons: In the FIG. 18 musical tone-generating apparatus according to the third embodiment, the MSB of each byte is used to indicate whether there is a continued byte, so that bits in each byte available for representation of each index are the seven less significant bits of the byte. In this case, in spite of the fact that as the index for the tone generator control register 33*a*, an index "EFh" is necessitated, the seven less significant bits of one byte can only express up to "7Fh". To eliminate this inconvenience, the index is expressed in two bytes, e.g. as in "6Fh 81h", and the two bytes are combined by setting one having the MSB of "1" to the higher-order byte, and removing the MSB of each byte, whereby it is possible to express the index "EFh". It should be noted that the FIG. 18 musical tone-generating apparatus according to the third embodiment is configured such that the index can be represented by the maximum three bytes for allowance purposes.

The data is configured such that it can be represented by three bytes so as to enable tone generator control register write data corresponding to a plurality of events to be expressed in a line, in the event that events of the same kind occur for a plurality of channels at timing having an identical value of time management information. It should be noted that the addresses into which data of events of the same kind are written are successive addresses as shown in the FIG. 7 tone generator control register map, and by making use of this, tone generator control register write data corresponding to a plurality of events can be expressed in one line.

An example of expression of tone generator control register write data corresponding to a plurality of events will be explained with reference to FIG. 20.

Figure 20:
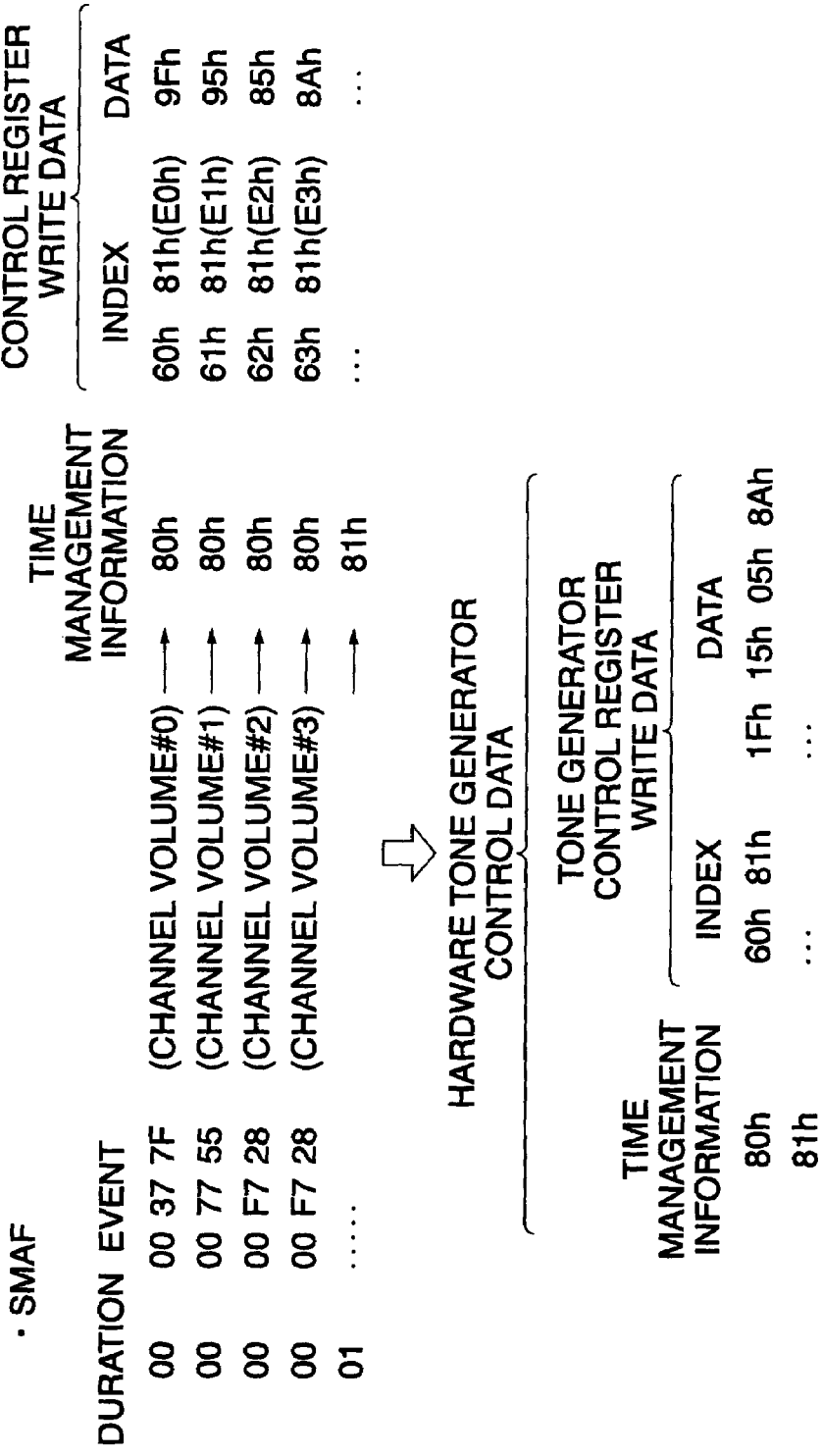
FIG. 20 is chart showing SMAF data and hardware tone generator control data converted from the SMAF data for comparison with each other.

FIG. 20 shows SMAF data and hardware tone generator control data converted from the SMAF data for comparison with each other. Duration data "00" and an event "00 37 7F" which is a channel volume message for a "channel number 0" at a first line of the SMAF data are converted to time management information "80h", an index "60h", and data "9Fh". Further, duration data "00" and an event "00 77 55" which is a channel volume message for a "channel number 1" at a second line of the SMAF data are converted to time management information "80h", an index "61h 81h" and data "95h". Further, duration data "00" and an event "00 F7 28" which is a channel volume message for a "channel number 2" at a third line of the SMAF data are converted to time management information "80h", index "62h 81h", and data "85h". Further, duration data "00" and an event "00 F7 28" which is a channel volume message for a "channel number 3" at a fourth line of the SMAF data are converted to time management information "80h", an index "63h 81h", and data "8Ah".

It should be noted that the index "60h 81h" is expressed by an index "E0h", the index "61h 81h" by an index "E1h", the index "62h 81h" by an index "E2h", and the index "63h" 81h" by an index "E3h", and the reason for this is as follows: In the FIG. 18 musical tone-generating apparatus according to the third embodiment, the index data can be expressed by one byte or a plurality of bytes, i.e. two bytes or three bytes, and in this case, the significant or effective bits of each byte are the seven less significant bits thereof as described above. When the MSB of the first byte of the index data is "0", this indicates that there follows an higher-order index byte, and when the MSB of the same is "1", this indicates that this is the highest-order index byte.

That is, the first byte of the index data shown in FIG. 20 is "60h", and the MSB thereof is "0", which indicates that a higher-order index byte follows. The index byte following the first byte is "81h", and the MSB of this byte is "1", which indicates that this byte is the highest-order byte. As described above, when the index is represented by a plurality of index bytes, they are read in the order of a lowest-order byte to a highest-order byte. Then, these bytes are rearranged in the order of the lowest-order byte to the highest-order byte, to provide index data "81h 61h", and each of the indexes (addresses of registers) generated therefrom is expressed by the less significant seven bits of a corresponding one of the bytes, to give "00 0000 1110 0000" in binary notation. Therefore, the significant bits are the less significant eight bits. If the less significant eight bits are expressed in hexadecimal notation, "E0h" is obtained. Thus, the index data "60h 81h" means the index "E0h", and similarly, the index "61h 81h" is represented by an index "E1h", and the index "62h 81h" by an index "E2h", and the index "63h 81h" by an index "E3h".

Events corresponding to these indexes are channel volume messages for successive channels, in which the addresses of correspondent registers are successive, and hence as shown in FIG. 20, they are set to successive indexes. Further, time management information is set to an identical value "80h". It should be noted that the time management information data can be also expressed by a plurality of bytes, and if the MSB of a byte of the time management information data is "0", this indicates that a time management information byte of a higher order follows, and if the MSB of the same is set to "1", this indicates that it is a time management information byte of the highest order. The significant bits of each byte are the less significant seven bits. That is, the time management information data at each of a first line to a fourth line in FIG. 20 is set to "80h", which is the highest-order byte, and time management information generated from the time management information data is "00h" formed by the less significant seven bits of the same. This time management information is set to the timer 32a of the sequencer 32.

As shown in FIG. 20, when there are used successive indexes and time management information for each of them has an identical value, by arranging corresponding data successively, SMAF data represented by a plurality of lines can be represented by a line of hardware tone generator control data. More specifically, as shown in a portion indicated by an arrow in FIG. 20, the first to fourth lines of the FIG. 20 SMAF data can be converted to a line of hardware tone generator control data, i.e. time management data "80h", index data "60h 81h", and data "1Fh 15h 05h 8Ah". In this case, the index is set to a first one of the successive indexes, and the following data are converted to the less significant seven bits, which are effective or significant, of each byte except the last one of them. More specifically, the first data "9Fh" is converted to data "1Fh", the second data "95h" to data "15h", and the third data "85h" to data "05h". The fourth data "8Ah" remains unchanged, so as to indicate that the fourth data "8Ah" is the last data byte by setting the MSB of the one line of hardware tone generator control data to "1". However, the data value of the fourth data is "0Ah" which is a portion exclusive of the MSB. Thus, when the indexes are successive with the time management information therefor having an identical value, the plurality of lines of SMAF data can be expressed by a line of hardware tone generator control data, so that the amount of the hardware tone generator control data can be reduced.

Next, the operation of the FIG. 18 musical tone-generating apparatus according to the third embodiment will be described with reference to FIGS. 21 to 24.

Figure 21:
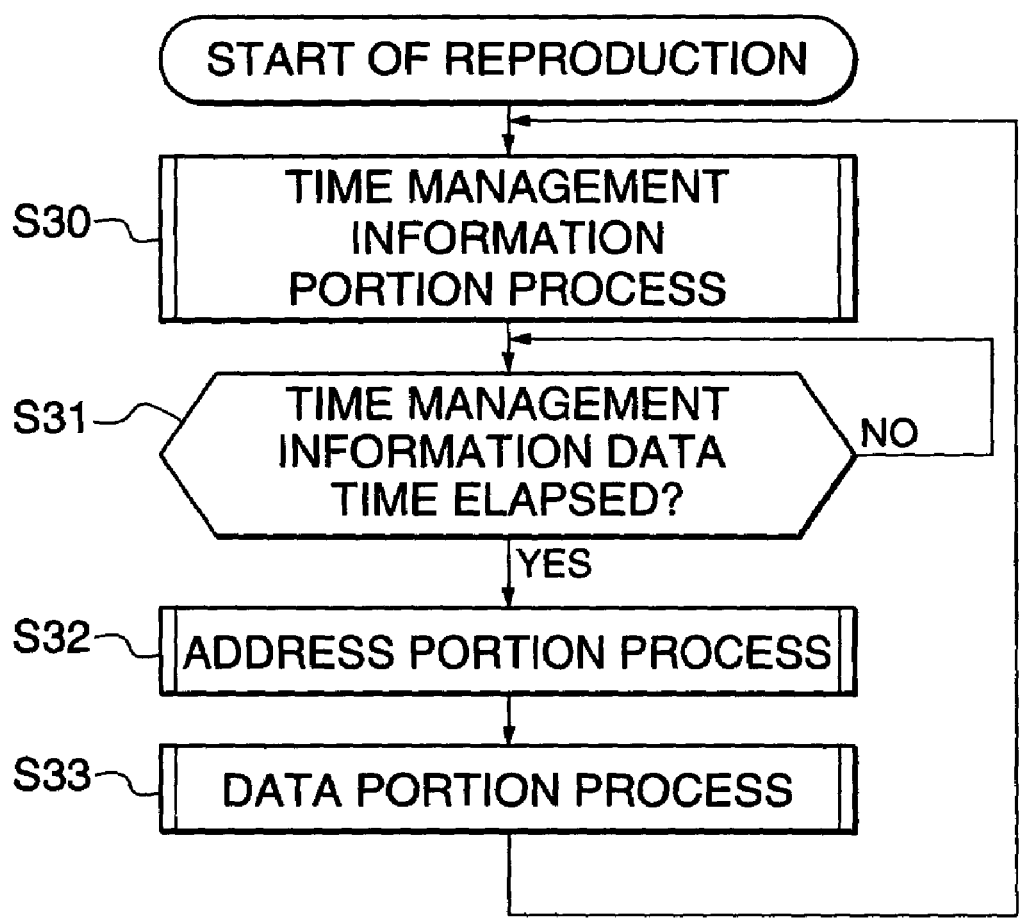
FIG. 21 is a flowchart illustrating a reproduction start process performed using the musical tone-generating apparatus according to the third embodiment.

Referring first to FIG. 21 showing a reproduction start process, when the sequencer start signal g output from the CPU 10 is applied to the sequencer 32, the counter 32a delivers the data decode start signal a to the data decode circuit 32b, thereby starting the reproduction start process. This causes a time management information portion process, described in detail hereinafter, to be carried out at a step S30. The time management information portion process is executed by the data decode circuit 32b, to generate time management information based on the time management information data read from the FIFO 31 one byte by one byte and set the generated time management information to the counter 32a. In the present embodiment, the time management information data is formed by one byte to three bytes.

Then, at a step S31, it is determined whether or not a time period indicated by the time management information set to the counter 32a has elapsed. If it is determined that the time period has not elapsed, the process waits for the counter 32a to count up to a value corresponding to the time period, and when it is determined that the time period has elapsed, the process proceeds to a step S32. It should be noted that it is determined that the time period has elapsed when the count of the counter 32 becomes equal to or larger than a value indicated by the set time management information, and when the time period has elapsed, the counter 32a delivers the register write permission signal d to the register write controller 32c.

At the step S32, an address portion process, described in detail hereinafter, is carried out. The address portion process is executed by operations of the data decode circuit 32b and the address controller 32d. In the present embodiment, based on the index data read from the FIFO 31 one byte by one byte, the address controller 32d carries out address control to generate addresses of the register in which the following data are to be written. In this embodiment, the index data is formed by one byte to three bytes.

When an address is generated at the step S32, the process proceeds to a step S33, wherein a data portion process, described in detail hereinafter, is carried out. The data portion process is executed by operations of the data decode circuit 32b, the address controller 32d, and the register write controller 32c, and data read from the FIFO 31 one byte by one byte are written into the tone generator control register 33a. In the present embodiment, each data is formed by one byte to three bytes. The data written into the tone generator control register 33a are data for generation of musical tones, which are used by the tone generator 33 to generate musical tones. The data portion process is executed after the step S31, so that data for generation of musical tones are written into the tone generator control register 33a when it is a time indicated by the time management information, so that musical tones are generate at the time indicated by the time management information.

When the data portion process at the step S33 is terminated, the process returns to a step S30, and thereafter, the steps S30 to S33 are repeatedly carried out to sequentially read hardware tone generator control data converted from the SMAF data, and the tone generator 33 carries out automatic performance.

Next, details of the time management information portion process at the step S30 of the reproduction start process will be described with reference to a flowchart shown in FIG. 22.

Figure 22:
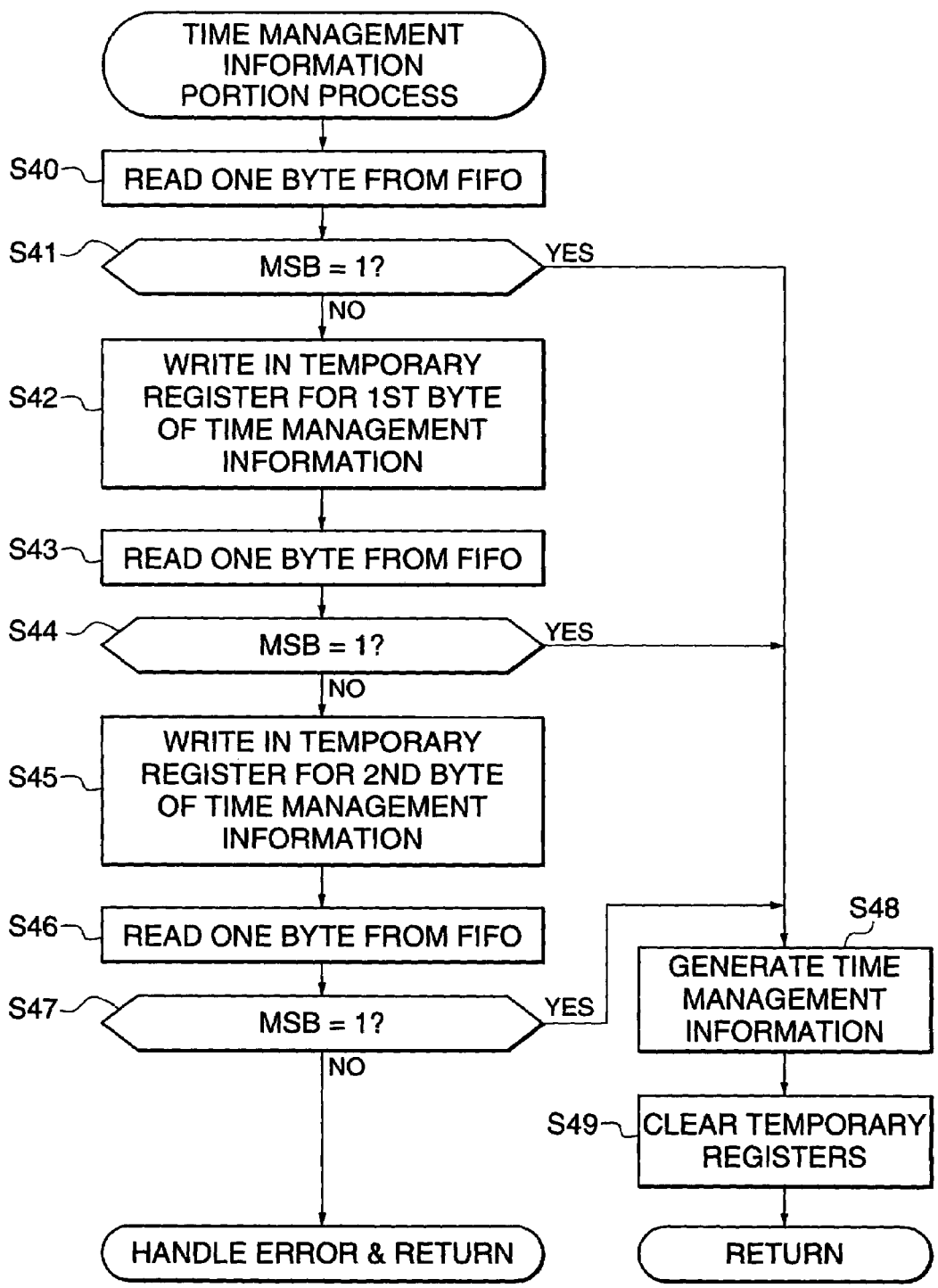
FIG. 22 is a flowchart illustrating a time management information portion process of the reproduction start process performed using the musical tone-generating apparatus according to the third embodiment.

When the FIG. 22 time management information portion process is started, at a step S40, the data decode circuit 32b reads one byte of hardware tone generator control data from the FIFO 31. Here, it is assumed that the read hardware tone generator control data is time management information data which is the first data of the hardware tone generator control data, or time management information data following data whose MSB is "1". Next, at a step S41, it is determined whether or not the MSB of the read one byte of the time management information data is "1". If it is determined here that the MSB is "0", this means that there follows another byte of time management information data of a higher order, and hence the process proceeds to a step S42, wherein the read one byte of the time management information data is written into a temporary register for the first byte of the time management information data. Then, at a step S43, the data decode circuit 32b reads one byte of the time management information data from the FIFO 31.

Then, it is determined at a step S44 whether or not the MSB of the read second byte of the time management information data is "1". If it is determined here that the MSB is "0", this means that there continues another byte of the time management information data of a higher order, and hence the program proceeds to a step S45, wherein the read second byte of the time management information data is written into a temporary register for the second byte of the time management information data. Then, at a step S46, the data decode circuit 32b reads a still another continued byte of the time management information data from the FIFO 31. Then, it is determined at a step S47 whether or not the MSB of the read one byte of the time management information data is "1". If it is determined here that the MSB of the read one byte of the time management information data is "0", this means that there follows another byte of the time management information data of a higher order. However, in the third embodiment, the time management information data is configured to be formed by three bytes at the maximum, and hence if it is determined that the MBS is "0", this means that an error occurred. Therefore, when the MSB is determined to be "0", error handling is carried out and then the process returns to the step S31 of the reproduction start process.

If it is determined at the step S41 that the MSB is "1", the read first byte of the time management information data is a byte of the highest order, and hence at a step S48, time management information is generated from the less significant seven bits of the read one byte, and set to the timer 32a. Then, at a step S49, all the temporary registers are cleared, and the process returns to the step S31 of the reproduction start process.

Further, if it is determined at the step S44 that the MSB is "1", this means that the second byte of time management information data read at the step S43 is a byte of the highest order, and hence at the step S48, time management information is generated from the less significant seven bits of each byte by setting the second byte of the time management information data to the higher-order byte, and the first byte of the time management information data stored in the temporary register therefor to the lower-order byte. The generated time management information is set to the timer 32a. Then, at the step S49, all the temporary registers are cleared, and the process returns to the step S31 of the reproduction start process.

Further, if it is determined at the step S47 that the MSB is "1", this means that the third byte of the time management information data read at the step S46 is a byte of the highest order, and hence at the step S48, time management information is generated from the less significant seven bits of each byte by setting the third byte of the time management information data to the highest-order byte, the second byte of the time management information data stored in the temporary register therefor to the medium-order byte, and the first byte of the time management information data stored in the temporary register therefor to the lowest-order byte. The generated time management information is set to the timer 32a. Then, at the step S49, all the temporary registers are cleared, and the process returns to the step S31 of the reproduction start process.

Example of the time management information portion process will be given in the following: Let it be assumed, for instance, that a data row of the time management information data is "03h 37h 81h". Then, the MSB of the first byte "03h" first read from the FIFO 31 is "0", and hence at the step S42, the read one-byte data "03h" is written into the temporary register therefor. Further, the MSB of the following one-byte data "37h" read from the FIFO 31 is also "0", and hence at the step S45, the data "37h" is written into the temporary register therefor. Further, the MSB of the further following one byte of data "81h" read from the FIFO 31 is "1", and the read data "81h" is determined to be a byte of the highest order. Then, at the step S48, by setting the data "81h" to the highest-order byte, the data "37h" stored in the temporary register for the second byte of the time management information data to the medium-order byte, and the data stored in the temporary register for the first byte of the time management information data to the lowest-order byte, the less significant seven bits of each byte are combined to form "00h 5Bh, 83h". The generated time management information "0h 5Bh 83h" is set to the counter 32a.

Next, details of the address portion process at the step S32 of the reproduction start process will be described with reference to a flowchart shown in FIG. 23.

Figure 23:
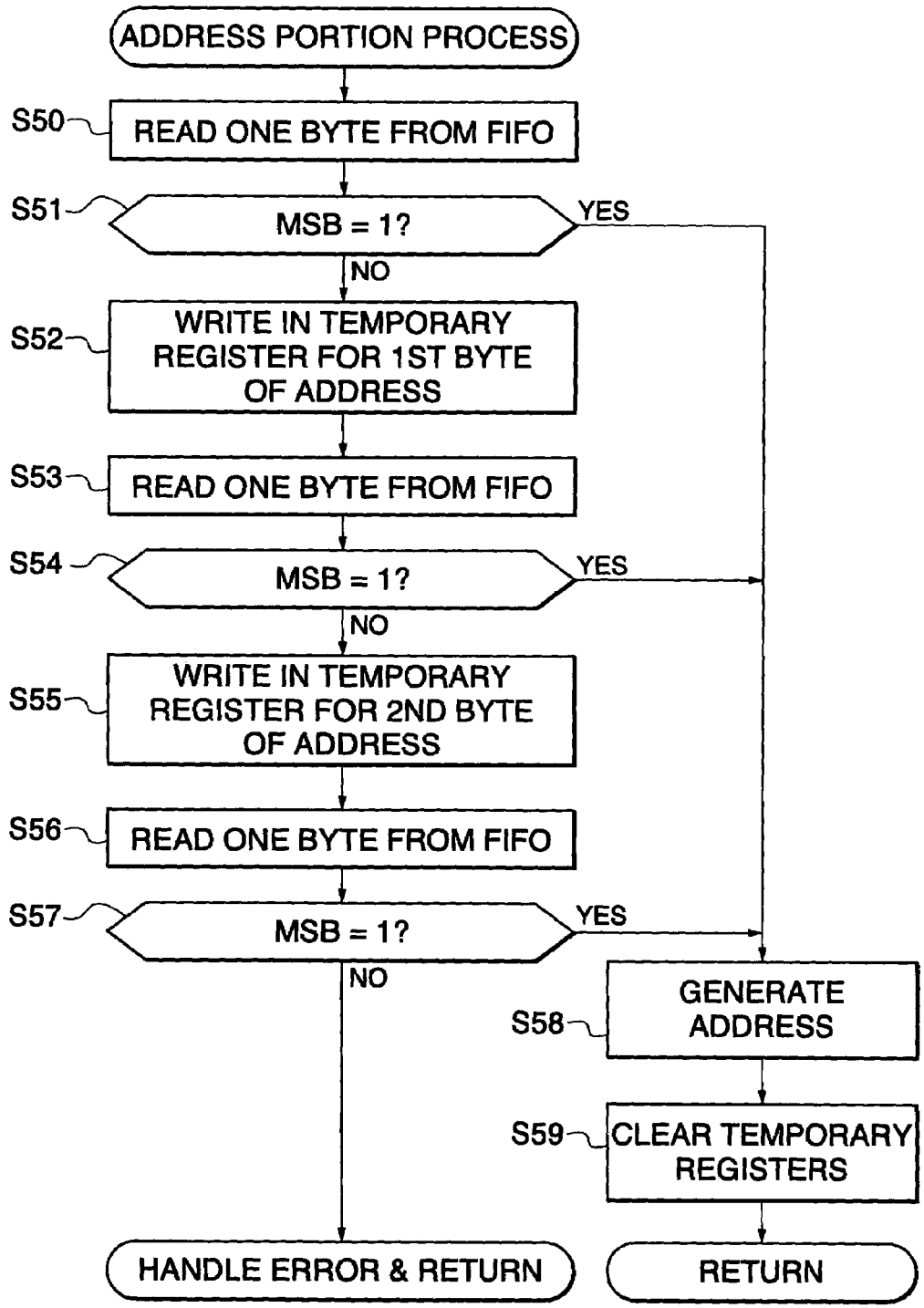
FIG. 23 is a flowchart illustrating an address portion process of the reproduction start process performed using the musical tone-generating apparatus according to the third embodiment.

When the FIG. 23 address portion process is started, at a step S50, the data decoder circuit 32b reads one byte of hardware tone generator control data from the FIFO 31. The read hardware tone generator control data is a data following the time management information data, and hence index data. Then, at a step S51, it is determined whether or not the MSB of the read one byte of the index data is "1". If it is determined here that the MSB is "0", this means that there follows an index byte data of a higher order, the process proceeds to a step S52, wherein the read one byte of the index data is written into a temporary register for the first byte of the address. Then, at a step S53, the data decoder circuit 32b reads in a following second byte of the index data from the FIFO 31.

Then, it is determined at a step S54, whether or not the MSB of the read second byte of the index data is "1". If it is determined here that the MSB is "0", this means that there follows another index data byte of a higher order, and hence at a step S55, the read second byte of the index data is written into a temporary register for the second byte of the index data. Then, at a step S56, the data decode circuit 32b reads in a still another following third byte of the index data from the FIFO 31. Then, at a step S57, it is determined whether or not the MSB of the read third byte of the index data is "1". If it is determined here that the MSB is "0", this means that there follows another index data byte of a higher order. However, in the present embodiment, the index data byte is configured to be formed by three bytes at the maximum, and hence if it is determined that the MSB is "0", this means that an error has occurred. Therefore, if it is determined that the MSB is "0", error handling is carried out, and then the process returns to the step S33 of the reproduction start process.

Further, if it is determined at the step S51 that the MSB is "1", the read first byte of the index data is the highest-order byte, and hence at a step S58, the read first byte of the index data is transferred to the address controller 32d. The address controller 32d generates an address for a register of the tone generator control register 33a, based on the less significant seven bits of the index data received, and supplies the address to the tone generator control register 33a, whereby the data supplied from the register write controller is written into this address. Then, at a step S59, all the temporary registers are cleared, and the process returns to the step S33 of the reproduction start process.

Further, if it is determined at the step S54 that the MSB is "1", the second byte of the index data read at the step S53 is a byte of the highest order, and hence the second byte of the index data, which is the higher-order byte of the two read bytes, and the first byte of the index data stored in the temporary register, which is the lower-order byte of the same, are transferred to the address controller 32*d*, at the step S58. Then, the address controller 32*d* generates an address for a register of the tone generator register 33*a* from the less significant seven bits of each byte of the index data of the received two bytes. The address is supplied to the tone generator control register 33*a*, and data supplied from the register write controller is written into the register having the address. Then, at the step S59, all the temporary registers are cleared, and the process returns to the step S33 of the reproduction start process.

Further, if it is determined at the step S57 that the MSB is "1", the third byte of the index data read at the step S56 is a byte of the highest order, and hence the third byte of the index data, which is the highest-order byte, the second byte stored in the temporary register for the second byte of the index data, which is the medium-order byte, and the first byte stored in the temporary register for the first byte of the index data, which is the lowest-order byte are transferred to the address controller 32*d* at the step S58. Then, the address controller 32*d* generates an address for a register of the tone generator control register 32*a* from the less significant seven bits of each of the received three bytes. This address is supplied to the tone generator control register 33*a* and the data supplied from the register write controller 32*c* is written into the register having the address. Then, all the temporary registers are cleared at the step S59, and the process returns to the step S33 of the reproduction start process.

Next, details of the data portion process at the step S33 of the reproduction start process will be described with reference to a flowchart shown in FIG. 24.

Figure 24:
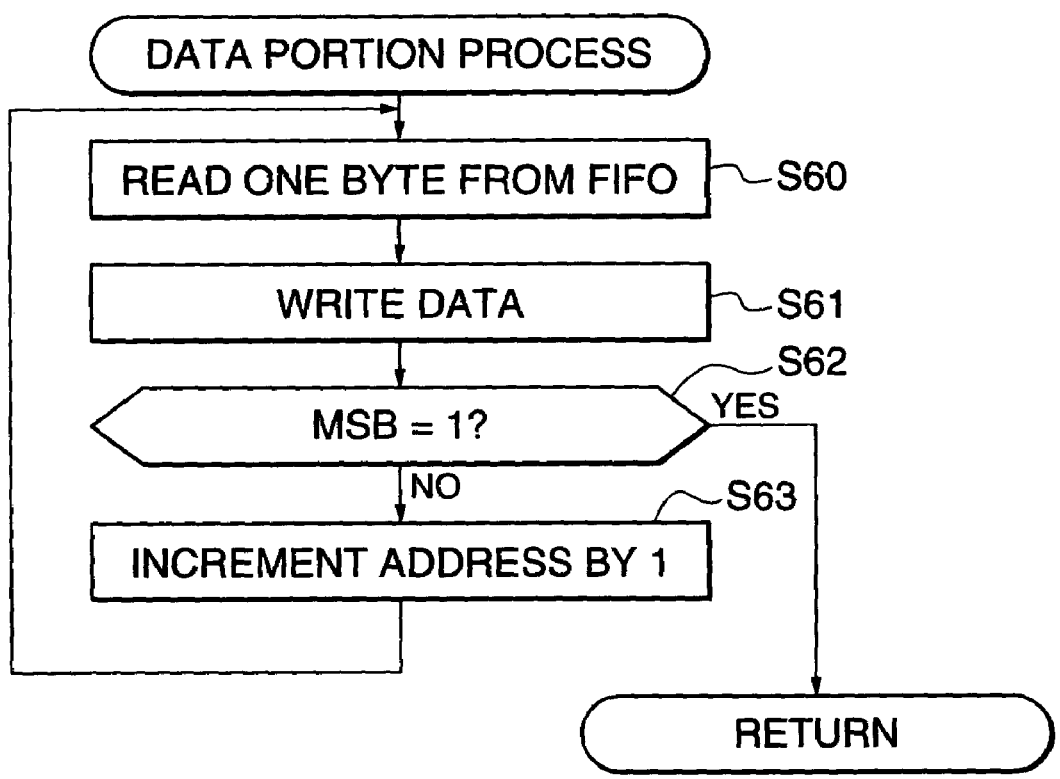
FIG. 24 is a flowchart illustrating a data portion process of the reproduction start process performed using the musical tone-generating apparatus according to the third embodiment.
Figure 25:
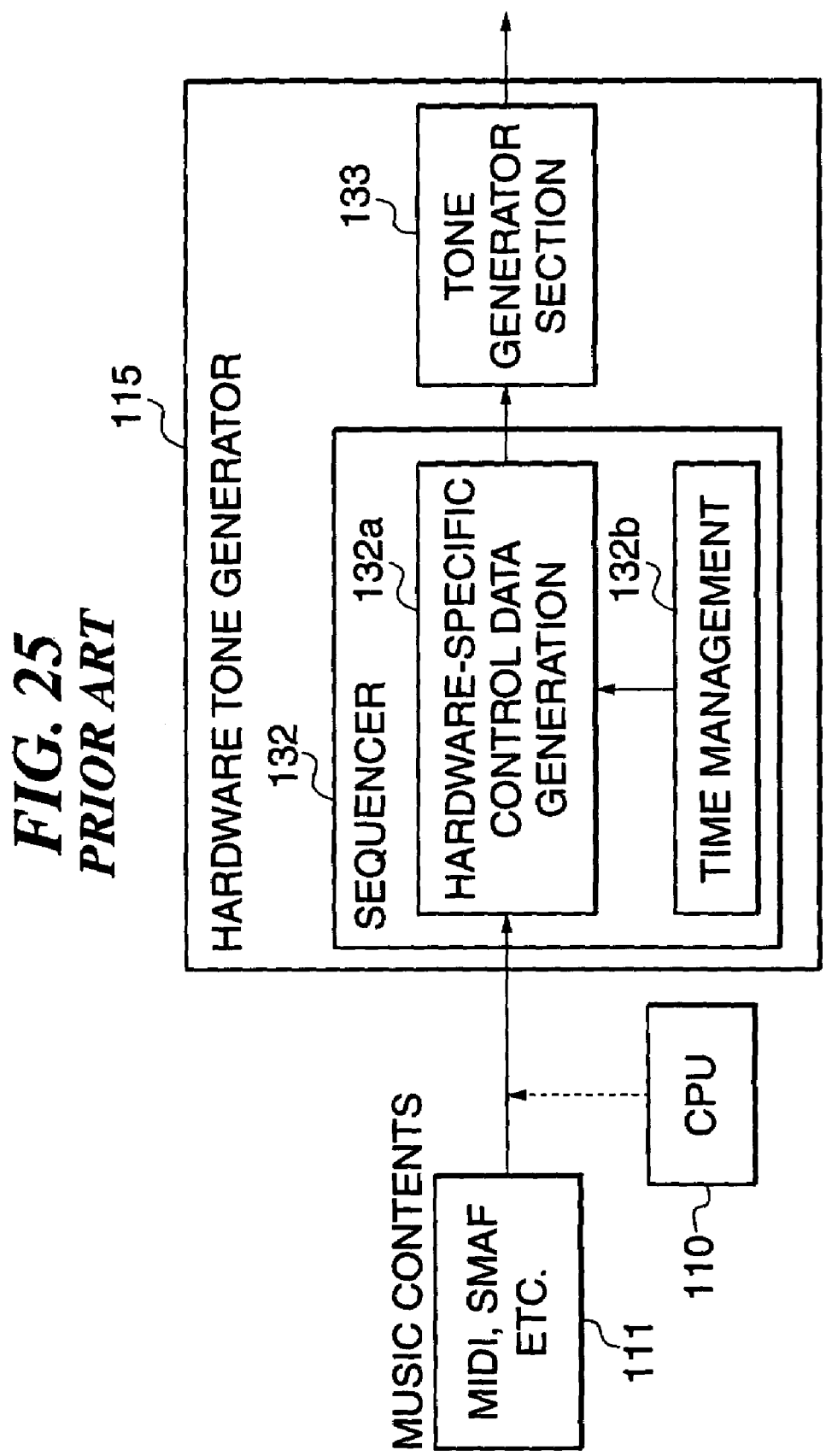
FIG. 25 is a diagram showing a conventional musical tone-generating apparatus implemented by hardware.
Figure 26:
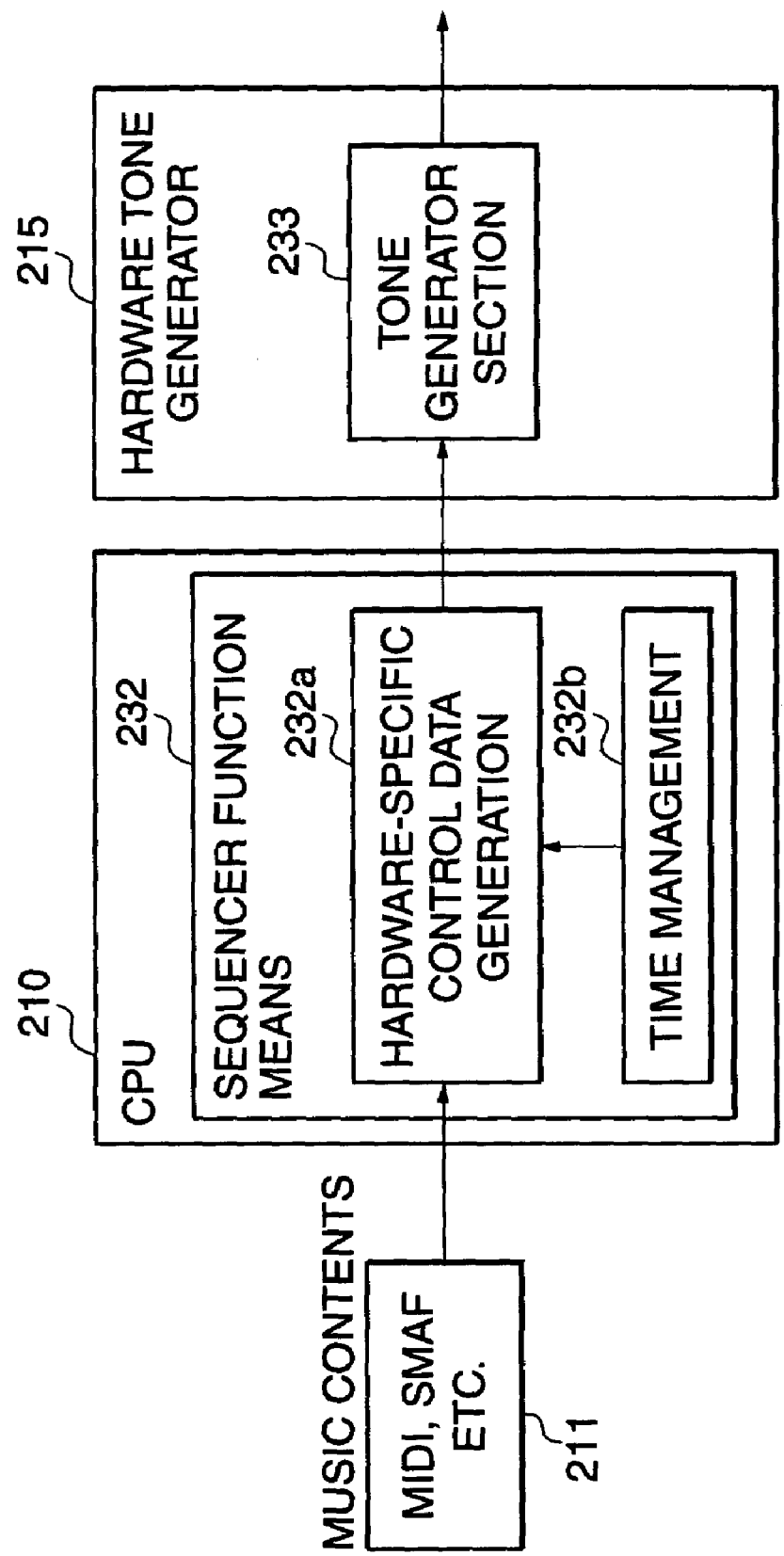
FIG. 26 is a diagram showing a conventional musical tone-generating apparatus implemented by software

When the FIG. 24 data portion process is started, at a step S60, the data decode circuit 32*b* reads one byte of hardware tone generator control data from the FIFO 31. The read hardware tone generator control data is data for generation of musical tones, which follows the index data, and hence is supplied to the register write controller 32*c* at a step S61. The register write controller 32*c* writes the supplied data into the tone generator control register 33*a* in timing in which the register write permission signal d is received from the counter 32*a*. In this case, the address controller 32*d* has already supplied the address of a register into which the data is to be written to the tone generator control register 33*a* by the address portion process at the step S32. Further, the register write permission signal d has already been delivered from the counter 32*a* by the process at the step S31 of the reproduction start signal. Therefore, the register write controller 32*c* immediately writes the data into the register having the address delivered from the address controller 32*d*.

Then, the data decoder circuit 32*b* determines at a step S62 whether or not the MSB of the read one byte of data is "1". If it is determined here that the MSB is "0", this means that there is another following data byte, and hence the program proceeds to a step S63, wherein the data decoder circuit 32*b* instructs the address controller 32*d* to increment the present address by 1. Responsive to this instruction, the address controller 32*d* increments the present address by 1, and the resulting address is applied to the tone generator control register 33*a*. This is because, as described hereinabove, if the data is formed by a plurality of bytes, each byte of data has time management information having an identical value, and the indexes i.e. addresses are continuous. When the processing at the step S63 is terminated, the process returns to the step S60, wherein the data decode circuit 32*b* reads another continuing one byte of data from the FIFO 31. The read data is supplied to the register write controller 32*c* at the step S61, and since the register write permission signal d has already been received from the counter 32*a*, the register write controller 32*c* immediately writes the continuing data into a register of the tone generator control register 33*a* having the incremented address.

Then, at the step S62, the data decoder circuit 32*b* determines whether or not the MSB of the continuously read one byte of data is "1". If it is determined here that the MSB is "0", this means that there follows another data byte, and hence the program proceeds to the step S63, wherein the data decoder circuit 32*b* instructs the address controller to increment the present address by 1. Responsive to this instruction, the address controller 32*d* further increments the address by 1, and applies the resulting address to the tone generator control register 33*a*. When the processing at the step S63 is terminated, the process returns to the step S60 wherein the data decoder circuit 32*b* reads in a still another continuing byte of data from the FIFO 31. The read data is supplied at the step S61 to the register write controller 32*c*, and since the register write permission signal d has already been received from the counter 32*a*, the register write controller 32*c* immediately writes the read one-byte data into a register of the tone generator control register 33*a* having the further incremented address. Then, the data decode circuit 32*b* determines whether or not the MSB of the continuously read one byte of data is "1". If it is determined here that the MSB is "1", this means the read data is a final data, and hence the process returns to the step S30 of the reproduction start process. Further, if it is determined that the MSB is "0", this means that there follows another data byte, and hence as described above, the steps S63 to S62 are repeatedly carried out until the MSB of a read one byte is "1". This makes it possible, even if the tone generator control register write data corresponding to a plurality of events are expressed in a line, to write data for generation of musical tones into respective registers corresponding thereto.

Incidentally, the MSB of one-byte data read from the FIFO 31 is used as a flag. Therefore, in carrying out the above processing dependent on the value of a register in which the one-byte data read from the FIFO 31 is written, the MSB of the register may be masked or ignored to pay attention to the less significant seven bits.

As described above, the FIG. 18 musical tone-generating apparatus according to the third embodiment of the invention, the hardware tone generator control data-converting means 10*b* converts music contents data stored in the area 11*a* of the RAM 11 to hardware tone generator control data. As shown in the example illustrated in FIG. 20, when time management information is identical in value and indexes assume successive values, the conversion process is carried out such that tone generator control register write data corresponding to a plurality of events are expressed in a line.

When the reproduction is instructed, the CPU 10 reads hardware tone generator control data corresponding to a musical piece the reproduction of which is instructed, from the area 11*b* of the RAM 11, and sequentially sends the read data to the hardware tone generator 15. The tone generator 33 generates musical tones based on the received hardware tone generator control data. It should be noted that if there exist setup data, such as tone color data, tempo data and volume data, at the head of music contents data, the setup data are also converted to the hardware tone generator control data and stored in advance in the area 11*b* of the RAM 11. Then, when the reproduction of the musical piece is instructed, first, the hardware tone generator control data corresponding to the setup data are read out from the area 11$b$, and transferred to the hardware tone generator 15. In succession thereto, the hardware tone generator control data are read out from the area 11$b$ and sequentially transferred to the hardware tone generator 15.

In the hardware tone generator 15, the data decode circuit 32$b$ decodes the hardware tone generator control data read in via the FIFO 31 to separate time management information data therefrom, and from the time management information data, generates time management information, which is set to the counter 32$a$. The generation of the time management information is carried out by the time management information portion process shown in FIG. 22, and hence time management information can be generated even if the time management information data is formed by a plurality of bytes. Further, the data decode circuit 32$b$ controls the address controller 32$d$ such that based on index data following the time management information data, addresses of registers of the tone generator control register 33$a$ into which data further following the index data are to be written are generated. The generation of such addresses is carried out by the address portion process shown in FIG. 23, and hence the addresses can be generated even if the index data is formed by a plurality of bytes.

Further, the data decode circuit 32$b$ supplies data for generation of musical tones, which follow the index data, to the register write controller 32$c$, and the register write controller 32$c$ writes the data supplied to the tone generator control register 33$a$ into the addresses designated by the address controller 32$d$ in timing of delivery of the register write permission signal d at a time corresponding to the time management information set to the counter 32$a$. This causes the tone generator 33 to generate musical tones based on the written data for generation of musical tones. It should be noted that the writing of data into the tone generator control register 33$a$ is carried out by the data portion process shown in FIG. 24, and hence when the data is formed by a plurality of bytes, each byte of data is written into a corresponding register of the tone generator control register 33$a$, while sequentially incrementing the address indicative of the register by 1.

As described hereinabove, when the musical tone-generating apparatus of the present invention is applied to a cellular phone as a mobile terminal apparatus according to the invention, when new music contents are downloaded into the cellular phone 1 from a download center or the like via the base station 2, it is possible to convert the downloaded musical contents to the hardware tone generator control data as described above, for reproduction of the contents. Further, when the cellular phone receives an incoming call, hardware tone generator control data corresponding to a predetermined musical piece designated for the incoming call music are read out from the RAM 11, for reproduction, whereby the incoming call music can be sounded.

It should be noted that the musical tone-generating apparatus of the present invention is not necessarily applied only to the cellular phone as the mobile terminal apparatus, but it may be also applied to a mobile information terminal capable of outputting musical tones, a mobile personal computer capable of outputting musical tones, etc. In this case, music contents data may be reproduced in synchronism with text data or image contents data.

Further, the tone generator section 33 of the hardware tone generator 15 may be formed by a tone generator of frequency modulation (FM) type. The FM tone generator utilizes harmonics generated by frequency modulation, for synthesis of musical tones, and is capable of generating a waveform containing harmonics components including harmonic tones. The FM tone generator is capable of generating a wide range of musical tones ranging from a synthesized sound of a natural musical instrument to an electronic sound. The FM tone generator uses an oscillator called "operator", which generates sinusoidal waves by oscillation in an equivalent manner, and for example, the FM tone generator can be constructed by connecting a first operator and a second operator by cascade connection. Further, the FM tone generator may be constructed by inputting an output from the operator to itself in a feedback manner.

Further, the tone generation method of the tone generator section is not limited to the FM tone generation method, but there may be employed a waveform memory tone generator (PCM tone generator, ADPCM tone generator) method, a physical model tone generator method, and so forth. The tone generator may be formed by a hardware tone generator implemented by DSP or the like.

Further, it also goes without saying that the object of the present invention may be accomplished by supplying a storage medium in which is stored a software program realizing the functions of the above-mentioned embodiments to a system or apparatus, and causing a computer (CPU or MPU) of the system or apparatus to read out and execute the program stored in the storage medium.

In this case, the code of the program itself read out from the storage medium achieves the novel functions of the above embodiments, and the storage medium storing the program constitutes the present invention.

The storage medium for supplying the program to the system or apparatus may be in the form of a floppy disk, a hard disk, an optical memory disk, a magneto-optical disk, a CD-ROM, a CD-R (CD-Recordable), DVD-ROM, a semiconductor memory, a magnetic tape, a nonvolatile memory card, or a ROM, for instance. Further, the program code may be supplied from a server computer via a MIDI apparatus or a communication network.

Further, needless to say, not only the functions of the above embodiment can be realized by carrying out the program read out by the computer but also an OS (operating system) or the like operating on the computer can carry out part or whole of actual processing in response to instructions of the code of the program, thereby making it possible to implement the functions of the above embodiments.

Furthermore, it goes without saying that after the code of the program read out from the storage medium has been written in a memory incorporated in a function extension board inserted in the computer or in a function extension unit connected to the computer, a CPU or the like arranged in the function extension board or the function extension unit may carry out part or whole of actual processing in response to the instructions of the code of the next program, thereby making it possible to achieve the functions of the above embodiments.

INDUSTRIAL APPLICABILITY

The musical tone-generating apparatus according to the invention converts music contents data to hardware tone generator control data by a conversion processing device realized by software, and carries out time management by a hardware tone generator. Therefore, the musical tone-generating apparatus can be suitably applied to a mobile terminal apparatus and the like which use a small-sized circuit for a sequencer of the hardware tone generator, and does not use a high-speed CPU.

What is claimed is:

1. A mobile terminal apparatus comprising:
   a control unit to control a musical tone-generating process;
   a memory unit to store music content data having time management data and event data; and
   a hardware tone generator unit including a first-in-first-out (FIFO) memory with a predetermined capacity, a sequencer, a tone generator control register, and a tone generator, wherein
   said control unit reads out said music content data from said memory unit, converts the read out music content data to register write data to be written into said tone generator control register, generates tone generator control data having the converted register write data and said time management data, and stores the generated tone generator control data to said memory unit, when said control unit has available processing time,
   said control unit reads out a predetermined amount of tone generator control data from said memory unit and transfers the read out tone generator control data to said FIFO memory, and further reads out a following tone generator control data and transfers the read out data to said FIFO memory every time said control unit receives a data request signal from said FIFO memory,
   said sequencer sequentially reads out the tone generator control data having the register write data and the time management data from said FIFO memory, and then writes the register write data into said tone generator control register when timing indicated by the time management data comes, and
   said tone generator generates a musical tone based on the register write data written into said tone generator control register.

2. A mobile terminal apparatus according to claim 1, wherein said hardware tone generator unit includes a counter for starting counting of clocks of a clock signal generated whenever a unit of reference time elapses, and said sequencer writes the register write data into said tone generator control register when a count of said counter becomes equal to or larger than a value indicated by the time management data.

3. A mobile terminal apparatus according to claim 1, including a point register for storing start point data indicative of a start point for musical performance of the music content data, and wherein said control unit starts reading out the tone generator control data at a start point indicated by the start point data from said memory unit in response to an instruction for reproduction.

4. A mobile terminal apparatus according to claim 1, wherein the register write data includes index information designating an address of said tone generator control register and control data to be written into the address for controlling a musical tone, when each of a plurality of time management data included in a plurality of tone generator control data to be generated by said control unit has an identical value and a plurality of index information included in a plurality of register write data of which the plurality of tone generator control data are composed have successive values, said control unit generates tone generator control data having first index information of the plurality of index information, a plurality of control data corresponding to the plurality of index information, and one of the plurality of time management data.

5. A mobile terminal apparatus according to claim 4, wherein when said control unit transfers the generated tone generator control data to said FIFO memory and then said sequencer reads out the tone generator control data from said FIFO memory, said sequencer writes first one of the plurality of control data included in the read out tone generator control data into the address indicated by the first index information and then writes each of the rest of the plurality of control data into said tone generator control register while the address is being incremented by 1.

6. A mobile terminal apparatus according to claim 2, wherein said sequencer separates the tone generator control data read out from said FIFO memory to the time management data and the register write data.

7. A mobile terminal apparatus according to claim 6, wherein the hardware tone generator control data is composed of units each comprising a set of the time management data, and the register write data including at least one pair of the index information and control data.

8. A mobile terminal apparatus according to claim 7, wherein each of the units of the tone generator control data is formed by the time management data, the index information, and the control data.

9. A musical tone-generating apparatus according to claim 8, wherein the time management data includes a time management data-discriminating address which indicates whether or not data immediately following the time management data-discriminating address is data of the value indicated by the time management data.

10. A musical tone-generating apparatus according to claim 3, wherein said point register is provided in said memory unit.

11. A musical tone-generating method comprising:
    a control process module for causing a control unit to carry out various processes including a musical tone-generating process; and
    a tone-generating module for causing a hardware tone generator unit that includes a FIFO memory with a predetermined capacity, a sequencer, a tone generator control register, and a tone generator to generate a musical tone, wherein
    said control process module reads out said music content data from a memory unit that stores music content data having time management data and event data, converts the read out music content data to register write data to be written into said tone generator control register, generates tone generator control data having the converted register write data and said time management data, and stores the generated tone generator control data to said memory unit, when said control unit has available processing time,
    said control process module reads out a predetermined amount of tone generator control data from said memory unit and transfers the read out tone generator control data to said FIFO memory, and further reads out a following tone generator control data and transfers the read out data to said FIFO memory every time said control unit receives a data request signal from said FIFO memory, and
    said tone-generating module causes said sequencer to sequentially read out the tone generator control data having the register write data and the time management data from said FIFO memory, and then write the register write data into said tone generator control register when timing indicated by the time management data comes, and
    said tone-generating module causes said tone generator to generate a musical tone based on the register write data written into said tone generator control register.

12. A computer readable medium having encoded thereon a program which when executed causes a computer to implement a musical tone-generating method for generating a musical tone based on music content data, the program comprising:
- a control process module for causing a control unit to carry out various processes including a musical tone-generating process; and
- a tone-generating module for causing a hardware tone generator unit that includes a FIFO memory with a predetermined capacity, a sequencer, a tone generator control register, and a tone generator to generate a musical tone, wherein
  - said control process module reads out said music content data from a memory unit that stores music content data having time management data and event data, converts the read out music content data to register write data to be written into said tone generator control register, generates tone generator control data having the converted register write data and said time management data, and stores the generated tone generator control data to said memory unit, when said control unit has available processing time,
  - said control process module reads out a predetermined amount of tone generator control data from said memory unit and transfers the read out tone generator control data to said FIFO memory, and further reads out a following tone generator control data and transfers the read out data to said FIFO memory every time said control unit receives a data request signal from said FIFO memory, and
- said tone-generating module causes said sequencer to sequentially read out the tone generator control data having the register write data and the time management data from said FIFO memory, and then write the register write data into said tone generator control register when timing indicated by the time management data comes, and
- said tone-generating module causes said tone generator to generate a musical tone based on the register write data written into said tone generator control register.

* * * * *